(12) United States Patent
Loft et al.

(10) Patent No.: US 12,539,472 B2
(45) Date of Patent: Feb. 3, 2026

(54) METHOD OF PREPARING CANNABINOIDS

(71) Applicant: Jazz Pharmaceuticals Research UK Limited, Sittingbourne (GB)

(72) Inventors: Michael Simon Loft, Cambridgeshire (GB); Alejandro Montellano Lopez, Cambridgeshire (GB); Alan James Silcock, Cambridgeshire (GB)

(73) Assignee: JAZZ PHARMACEUTICALS RESEARCH UK LIMITED, Sittingbourne (GB)

( * ) Notice: Subject to any disclaimer, the term of this patent is extended or adjusted under 35 U.S.C. 154(b) by 326 days.

(21) Appl. No.: 18/043,810

(22) PCT Filed: Aug. 27, 2021

(86) PCT No.: PCT/EP2021/073804
§ 371 (c)(1),
(2) Date: Mar. 2, 2023

(87) PCT Pub. No.: WO2022/049007
PCT Pub. Date: Mar. 10, 2022

(65) Prior Publication Data
US 2024/0293762 A1      Sep. 5, 2024

(30) Foreign Application Priority Data

Sep. 2, 2020   (GB) .................................... 2013765

(51) Int. Cl.
*B01D 11/04*   (2006.01)
*A61K 36/185*   (2006.01)
(Continued)

(52) U.S. Cl.
CPC ........ *B01D 11/0492* (2013.01); *A61K 36/185* (2013.01); *B01D 9/0036* (2013.01);
(Continued)

(58) Field of Classification Search
CPC .............. B01D 11/0492; B01D 9/0036; B01D 9/0045; B01D 11/0288; B01D 9/0013;
(Continued)

(56) References Cited

U.S. PATENT DOCUMENTS 7,244,736 B2   7/2007   Blum et al.
8,632,825 B2   1/2014   Velasco Diez et al.
(Continued)

FOREIGN PATENT DOCUMENTS

CN   110304994 A   10/2019
EP   2311475 A2   4/2011
(Continued)

OTHER PUBLICATIONS

Elsohly, M. & Gul, W., Handbook of Cannabis, Chapter 1, Constituents of Cannabis Sativa, Roger Pertwee, Ed., 2012, 21 pages.
(Continued)

*Primary Examiner* — Joseph W Drodge
(74) *Attorney, Agent, or Firm* — COOLEY LLP

(57) ABSTRACT

The pharmaceutical industry is highly regulated to ensure the safety, efficacy, and quality of medicines and drug discolouration is one of the leading causes for drug recall. An object of the present invention is to provide an improved method of manufacturing cannabinoids for use in pharmaceuticals that is both stable and substantially pure. Such use of stable and substantially pure cannabinoids in pharmaceuticals will improve patient compliance to medication. The main steps of the method are decarboxylation, extraction, winterization and crystallisation.

19 Claims, 19 Drawing Sheets

(51) Int. Cl.
*B01D 9/00* (2006.01)
*B01D 11/02* (2006.01)
*C07C 39/23* (2006.01)

(52) U.S. Cl.
CPC ........ *B01D 9/0045* (2013.01); *B01D 11/0288* (2013.01); *C07C 39/23* (2013.01)

(58) Field of Classification Search
CPC .... B01D 11/0203; B01D 11/028; B01D 9/00; B01D 11/00; B01D 11/02; B01D 11/0284; B01D 11/0292; B01D 9/02; B01D 2009/086; B01D 2009/009; B01D 2009/0095; B01D 37/00; C07C 39/23; A61K 2236/00; A61K 36/185
See application file for complete search history.

(56) References Cited

U.S. PATENT DOCUMENTS

| | | | |
|---|---|---|---|
| 8,790,719 | B2 | 7/2014 | Parolaro et al. |
| 8,895,078 | B2 | 11/2014 | Mueller |
| 9,017,737 | B2 | 4/2015 | Kikuchi et al. |
| 9,125,859 | B2 | 9/2015 | Whalley et al. |
| 9,474,726 | B2 | 10/2016 | Guy et al. |
| 9,675,654 | B2 | 6/2017 | Parolaro et al. |
| 9,919,241 | B1 | 3/2018 | Auerbach et al. |
| 9,949,936 | B2 | 4/2018 | Guy et al. |
| 9,949,937 | B2 | 4/2018 | Guy et al. |
| 9,956,183 | B2 | 5/2018 | Guy et al. |
| 9,956,184 | B2 | 5/2018 | Guy et al. |
| 9,956,185 | B2 | 5/2018 | Guy et al. |
| 9,956,186 | B2 | 5/2018 | Guy et al. |
| 9,962,341 | B2 | 5/2018 | Stott et al. |
| 10,039,724 | B2 | 8/2018 | Stott et al. |
| 10,092,525 | B2 | 10/2018 | Guy et al. |
| 10,098,867 | B2 | 10/2018 | Javid et al. |
| 10,111,840 | B2 | 10/2018 | Guy et al. |
| 10,137,095 | B2 | 11/2018 | Guy et al. |
| 10,155,176 | B1 | 12/2018 | Feuer et al. |
| 10,220,005 | B2 | 3/2019 | Martinez-Orgado et al. |
| 10,226,433 | B2 | 3/2019 | Di Marzo et al. |
| 10,315,129 | B1 | 6/2019 | Auerbach et al. |
| 10,414,709 | B1* | 9/2019 | Tegen ................ B01D 11/0292 |
| 10,583,096 | B2 | 3/2020 | Guy et al. |
| 10,603,288 | B2 | 3/2020 | Guy et al. |
| 10,604,464 | B2 | 3/2020 | Oroskar et al. |
| 10,653,641 | B2 | 5/2020 | Robson et al. |
| 10,709,671 | B2 | 7/2020 | Guy et al. |
| 10,709,673 | B2 | 7/2020 | Guy |
| 10,709,674 | B2 | 7/2020 | Guy et al. |
| 10,729,665 | B2 | 8/2020 | Whalley et al. |
| 10,758,514 | B2 | 9/2020 | Liu et al. |
| 10,765,643 | B2 | 9/2020 | Guy et al. |
| 10,799,467 | B2 | 10/2020 | Whalley et al. |
| 10,807,777 | B2 | 10/2020 | Whittle |
| 10,849,860 | B2 | 12/2020 | Guy et al. |
| 10,918,608 | B2 | 2/2021 | Guy et al. |
| 10,966,939 | B2 | 4/2021 | Guy et al. |
| 11,000,486 | B2 | 5/2021 | Wright et al. |
| 11,065,209 | B2 | 7/2021 | Guy et al. |
| 11,065,227 | B2 | 7/2021 | Stott et al. |
| 11,096,905 | B2 | 8/2021 | Guy et al. |
| 11,147,776 | B2 | 10/2021 | Stott et al. |
| 11,147,783 | B2 | 10/2021 | Stott et al. |
| 11,154,516 | B2 | 10/2021 | Guy et al. |
| 11,154,517 | B2 | 10/2021 | Guy et al. |
| 11,160,757 | B1 | 11/2021 | Wilkhu et al. |
| 11,160,795 | B2 | 11/2021 | Guy et al. |
| 11,207,292 | B2 | 12/2021 | Guy et al. |
| 11,229,612 | B2 | 1/2022 | Wright et al. |
| 11,291,631 | B2 | 4/2022 | Shah |
| 11,311,498 | B2 | 4/2022 | Guy et al. |
| 11,318,109 | B2 | 5/2022 | Whalley et al. |
| 11,357,741 | B2 | 6/2022 | Guy et al. |
| 11,400,055 | B2 | 8/2022 | Guy et al. |
| 11,406,623 | B2 | 8/2022 | Guy et al. |
| 11,413,266 | B2 | 8/2022 | Biró et al. |
| 11,419,829 | B2 | 8/2022 | Whalley et al. |
| 11,426,362 | B2 | 8/2022 | Wright et al. |
| 11,446,258 | B2 | 9/2022 | Guy et al. |
| 11,590,087 | B2 | 2/2023 | Guy et al. |
| 11,633,369 | B2 | 4/2023 | Guy et al. |
| 11,679,087 | B2 | 6/2023 | Guy et al. |
| 11,684,598 | B2 | 6/2023 | Stott et al. |
| 11,701,330 | B2 | 7/2023 | Guy et al. |
| 2006/0167283 | A1 | 7/2006 | Flockhart et al. |
| 2015/0359756 | A1 | 12/2015 | Guy et al. |
| 2017/0239193 | A1 | 8/2017 | Guy et al. |
| 2018/0071210 | A1 | 3/2018 | Wilkhu et al. |
| 2018/0228751 | A1 | 8/2018 | Stott et al. |
| 2019/0167583 | A1 | 6/2019 | Shah |
| 2019/0201809 | A1* | 7/2019 | Nadal Roura ..... B01D 15/1807 |
| 2019/0307695 | A1* | 10/2019 | Colvin ................ A61K 9/1611 |
| 2019/0314296 | A1 | 10/2019 | Wright et al. |
| 2019/0321307 | A1 | 10/2019 | Guy et al. |
| 2019/0365667 | A1 | 12/2019 | Wright et al. |
| 2020/0138738 | A1 | 5/2020 | Guy et al. |
| 2020/0170944 | A1 | 6/2020 | Jackowetz et al. |
| 2020/0179303 | A1 | 6/2020 | Guy et al. |
| 2020/0181050 | A1 | 6/2020 | Cipolletti et al. |
| 2020/0199055 | A1 | 6/2020 | Jansen et al. |
| 2020/0206153 | A1 | 7/2020 | Whalley et al. |
| 2020/0237683 | A1 | 7/2020 | Whalley et al. |
| 2020/0297656 | A1 | 9/2020 | Guy et al. |
| 2020/0352878 | A1 | 11/2020 | Guy et al. |
| 2021/0015789 | A1 | 1/2021 | Guy et al. |
| 2021/0017145 | A1 | 1/2021 | Mueller |
| 2021/0052512 | A1 | 2/2021 | Guy et al. |
| 2021/0059949 | A1 | 3/2021 | Wilkhu et al. |
| 2021/0059960 | A1 | 3/2021 | Wilkhu et al. |
| 2021/0059976 | A1 | 3/2021 | Wilkhu et al. |
| 2021/0069333 | A1 | 3/2021 | Velasco Diez et al. |
| 2021/0100755 | A1 | 4/2021 | Whalley et al. |
| 2021/0169824 | A1 | 6/2021 | Guy et al. |
| 2021/0177773 | A1 | 6/2021 | Guy et al. |
| 2021/0290565 | A1 | 9/2021 | Guy et al. |
| 2021/0308072 | A1 | 10/2021 | Wright et al. |
| 2021/0330636 | A1 | 10/2021 | Guy et al. |
| 2021/0370198 | A1* | 12/2021 | Lanier ................ A61K 36/185 |
| 2021/0401771 | A1 | 12/2021 | Guy et al. |
| 2022/0000800 | A1 | 1/2022 | Guy et al. |
| 2022/0008355 | A1 | 1/2022 | Guy et al. |
| 2022/0016048 | A1 | 1/2022 | Guy et al. |
| 2022/0023232 | A1 | 1/2022 | Guy et al. |
| 2022/0040155 | A1 | 2/2022 | Guy et al. |
| 2022/0062197 | A1 | 3/2022 | Stott et al. |
| 2022/0062211 | A1 | 3/2022 | Stott et al. |
| 2022/0087951 | A1 | 3/2022 | Knappertz |
| 2022/0096397 | A1 | 3/2022 | Wright et al. |
| 2022/0168266 | A1 | 6/2022 | Guy et al. |
| 2022/0183997 | A1 | 6/2022 | Guy et al. |
| 2022/0184000 | A1 | 6/2022 | Guy et al. |
| 2022/0202738 | A1 | 6/2022 | Guy et al. |
| 2022/0211629 | A1 | 7/2022 | Wilkhu et al. |
| 2022/0226257 | A1 | 7/2022 | Guy et al. |
| 2022/0233495 | A1 | 7/2022 | Silcock et al. |
| 2022/0249396 | A1 | 8/2022 | Guy et al. |
| 2022/0257529 | A1 | 8/2022 | Guy et al. |
| 2022/0265573 | A1 | 8/2022 | Guy et al. |
| 2022/0288055 | A1 | 9/2022 | Silcock et al. |
| 2022/0378715 | A1 | 12/2022 | Guy et al. |
| 2022/0378738 | A1 | 12/2022 | Guy et al. |
| 2022/0387347 | A1 | 12/2022 | Whalley et al. |
| 2022/0395470 | A1 | 12/2022 | Whalley et al. |
| 2022/0395471 | A1 | 12/2022 | Guy et al. |
| 2023/0000789 | A1 | 1/2023 | Guy et al. |
| 2023/0022487 | A1 | 1/2023 | Guy et al. |
| 2023/0024312 | A1 | 1/2023 | Whalley et al. |
| 2023/0026079 | A1 | 1/2023 | Guy et al. |
| 2023/0032502 | A1 | 2/2023 | Guy et al. |
| 2023/0038423 | A1 | 2/2023 | Silcock et al. |
| 2023/0068885 | A1 | 3/2023 | Guy et al. |
| 2023/0143812 | A1 | 5/2023 | Knappertz et al. |

(56) References Cited

U.S. PATENT DOCUMENTS

| | | | |
|---|---|---|---|
| 2023/0235825 | A1 | 7/2023 | Thompson et al. |
| 2023/0248664 | A1 | 8/2023 | Guy |
| 2023/0263744 | A1 | 8/2023 | Guy et al. |
| 2023/0416177 | A1* | 12/2023 | Jansen ............ C07C 37/004 |

FOREIGN PATENT DOCUMENTS

| | | |
|---|---|---|
| GB | 2548873 A | 10/2017 |
| GB | 2574321 A | 12/2019 |
| JP | 2000078979 A | 3/2000 |
| JP | 2001029082 A | 2/2001 |
| WO | WO-02064109 A2 | 8/2002 |
| WO | WO-2008120207 A2 | 10/2008 |
| WO | WO-2013057123 A1 | 4/2013 |
| WO | WO-2016203239 A1 | 12/2016 |
| WO | WO-2018165766 A1 | 9/2018 |
| WO | WO-2019020738 A1 | 1/2019 |
| WO | WO-2019097238 A1 | 5/2019 |
| WO | WO-2019207319 A1 | 10/2019 |

OTHER PUBLICATIONS

Epidiolex® (cannabidiol) oral solution, CV, Prescribing Information, 2018, 30 pages; https://www.accessdata.fda.gov/drugsatfda_docs/label/2018/210365lbl.pdf.
Pertwee, R. G., "The Pharmacology and Therapeutic Potential of Cannabidiol," Cannabinoids, Chapter 3, DiMarzo, V. (Ed.), pp. 32-83 (2004).
U.S. Appl. No. 15/640,033, filed Jun. 30, 2017.
U.S. Appl. No. 16/768,241, filed May 29, 2020.
U.S. Appl. No. 16/959,350, filed Jun. 30, 2020.
U.S. Appl. No. 16/959,354, filed Jun. 30, 2020.
U.S. Appl. No. 16/959,357, filed Jun. 30, 2020.
U.S. Appl. No. 16/935,005, filed Jul. 21, 2020.
U.S. Appl. No. 17/012,448, filed Sep. 4, 2020.
U.S. Appl. No. 17/050,956, filed Oct. 27, 2020.
U.S. Appl. No. 17/102,109, filed Nov. 23, 2020.
U.S. Appl. No. 17/231,625, filed Apr. 15, 2021.
U.S. Appl. No. 17/296,066, filed May 21, 2021.
U.S. Appl. No. 17/296,076, filed May 21, 2021.
U.S. Appl. No. 17/424,682, filed Jul. 21, 2021.
U.S. Appl. No. 17/426,442, filed Jul. 28, 2021.
U.S. Appl. No. 17/406,401, filed Aug. 19, 2021.
U.S. Appl. No. 17/435,892, filed Sep. 2, 2021.
U.S. Appl. No. 17/472,000, filed Sep. 10, 2021.
U.S. Appl. No. 17/548,232, filed Dec. 10, 2021.
U.S. Appl. No. 17/606,370, filed Oct. 25, 2021.
U.S. Appl. No. 17/611,824, filed Nov. 16, 2021.
U.S. Appl. No. 17/529,005, filed Nov. 17, 2021.
U.S. Appl. No. 17/615,422, filed Nov. 30, 2021.
U.S. Appl. No. 17/552,487, filed Dec. 16, 2021.
U.S. Appl. No. 17/576,868, filed Jan. 14, 2022.
U.S. Appl. No. 17/585,485, filed Jan. 26, 2022.
U.S. Appl. No. 17/627,946, filed Jan. 18, 2022.
U.S. Appl. No. 17/631,069, filed Jan. 28, 2022.
U.S. Appl. No. 17/638,629, filed Feb. 25, 2022.
U.S. Appl. No. 17/689,607, filed Mar. 8, 2022.
U.S. Appl. No. 17/689,245, filed Mar. 8, 2022.
U.S. Appl. No. 17/744,224, filed May 13, 2022.
U.S. Appl. No. 17/705,443, filed Mar. 28, 2022.
U.S. Appl. No. 17/768,048, filed Apr. 11, 2022.
U.S. Appl. No. 17/770,435, filed Apr. 20, 2022.
U.S. Appl. No. 17/770,436, filed Apr. 20, 2022.
U.S. Appl. No. 17/771,184, filed Apr. 22, 2022.
U.S. Appl. No. 17/771,190, filed Apr. 22, 2022.
U.S. Appl. No. 17/771,195, filed Apr. 22, 2022.
U.S. Appl. No. 17/771,183, filed Apr. 22, 2022.
U.S. Appl. No. 17/777,734, filed May 18, 2022.
U.S. Appl. No. 17/777,677, filed May 18, 2022.
U.S. Appl. No. 17/777,681, filed May 18, 2022.
U.S. Appl. No. 17/841,167, filed Jun. 15, 2022.
U.S. Appl. No. 17/786,949, filed Jun. 17, 2022.
U.S. Appl. No. 17/817,753, filed Aug. 5, 2022.
U.S. Appl. No. 17/853,367, filed Jun. 29, 2022.
U.S. Appl. No. 18/002,437, filed Dec. 19, 2022.
U.S. Appl. No. 18/005,838, filed Jan. 17, 2023.
U.S. Appl. No. 18/005,841, filed Jan. 17, 2023.
U.S. Appl. No. 18/005,845, filed Jan. 17, 2023.
U.S. Appl. No. 18/005,843, filed Jan. 17, 2023.
U.S. Appl. No. 18/005,847, filed Jan. 17, 2023.
U.S. Appl. No. 18/005,848, filed Jan. 17, 2023.
U.S. Appl. No. 18/005,851, filed Jan. 18, 2023.
U.S. Appl. No. 18/005,852, filed Jan. 18, 2023.
U.S. Appl. No. 18/005,853, filed Jan. 18, 2023.
U.S. Appl. No. 18/005,959, filed Jan. 18, 2023.
U.S. Appl. No. 18/005,960, filed Jan. 18, 2023.
U.S. Appl. No. 18/005,961, filed Jan. 18, 2023.
U.S. Appl. No. 18/006,125, filed Jan. 19, 2023.
U.S. Appl. No. 18/006,127, filed Jan. 19, 2023.
U.S. Appl. No. 18/006,129, filed Jan. 19, 2023.
U.S. Appl. No. 18/006,131, filed Jan. 19, 2023.
U.S. Appl. No. 18/006,133, filed Jan. 19, 2023.
U.S. Appl. No. 18/006,121, filed Jan. 19, 2023.
U.S. Appl. No. 18/161,603, filed Jan. 30, 2023.
U.S. Appl. No. 18/170,235, filed Feb. 16, 2023.
U.S. Appl. No. 18/044,941, filed Mar. 10, 2023.
U.S. Appl. No. 18/245,856, filed Mar. 17, 2023.
U.S. Appl. No. 18/186,792, filed Mar. 20, 2023.
U.S. Appl. No. 18/311,221, filed May 2, 2023.
U.S. Appl. No. 18/320,906, filed May 19, 2023.
U.S. Appl. No. 18/256,307, filed Jun. 7, 2023.
U.S. Appl. No. 18/257,373, filed Jun. 14, 2023.
U.S. Appl. No. 18/257,537, filed Jun. 14, 2023.
U.S. Appl. No. 18/257,479, filed Jun. 14, 2023.
U.S. Appl. No. 18/258,485, filed Jun. 20, 2023.
U.S. Appl. No. 18/446,405, filed Aug. 8, 2023.
U.S. Appl. No. 18/546,254, filed Aug. 11, 2023.
U.S. Appl. No. 18/548,003, filed Aug. 25, 2023.
Edwards, J. E. & Otterson, D. W., "Tech Talk: (4) Pressure Measurement Basics," Measurement and Control, vol. 47, No. 8, pp. 241-245 (2014).
Hendricks, H. et al., "Mono- and Sesqui-Terpene Hydrocarbons of the Essential Oil of Cannabis Sativa," Phytochemical Reports, vol. 14, pp. 814 and 815 (1975).
[No Author Listed] Guidance for Industry, Botanical Drug Products, Draft Guidance, U.S. Department of Health and Human Services, Food and Drug Administration, Center for Drug Evaluation and Research, Aug. 2000, 43 pages.
Small, E. & Beckstead, H.D., "Common Cannabinoid Phenotypes in 350 Stocks of Cannabis," Lloydia, 36(2):144-165 (1973).
Turner, C. E. et al., "Constituents of *Cannabis sativa* L.," Biomedical Mass Spectrometry, 7(6):247-256 (1980).

* cited by examiner

| Batch number | Antioxidant |
|---|---|
| B1 | Alpha Tocopherol |
| B2 | EDTA |
| B3 | Sodium Metabisulphite |
| B4 | BHA |
| B5 | Citric Acid |
| B6 | Ascorbyl Palmitate |
| B7 | Mono thiolglycerol |

METHOD OF PREPARING CANNABINOIDS

CROSS-REFERENCE TO RELATED APPLICATIONS

This application is a U.S. National Phase application, filed under 35 U.S.C. § 371 (c), of International Application No. PCT/EP2021/073804, filed Aug. 27, 2021, which claims priority to, and the benefit of, United Kingdom Patent Application No. 2013765.9, filed Sep. 2, 2020. Each of these documents is incorporated by reference herein in its entirety for all purposes.

FIELD OF THE INVENTION

The present invention relates to a method of preparing cannabinoids that is both stable and substantially pure. The cannabinoids can be used as the active ingredient in a pharmaceutical formulation.

BACKGROUND TO THE INVENTION

The pharmaceutical industry is highly regulated to ensure the safety, efficacy, and quality of medicines, as well as the relevance and accuracy of product information. Drug regulators and manufacturers are looking more closely at the role of product appearance and physical characteristics in assuring the safe and appropriate use of medicines. There are concerns that interchangeable drugs with different physical appearance, such as different sizes, colours, and shapes, could lead to medication errors or reduce consumer acceptance of a prescribed treatment, undermining patient compliance.

Drug discolouration is one of the leading causes for drug recall (Ahuja S. & Dong M. Elsevier, 9 Feb. 2005 'Handbook of Pharmaceutical Analysis by HPLC'). Discolouration refers to the change in colour on the dosage form from the specified appearance. It may occur as a result of cross-contamination during the manufacturing process, or during drug products' transportation, distribution, and/or storage. As discolouration of drug products may affect drug product potency, degradation products and impurities, drug products need to be recalled in cases where discolouration has occurred and the chemical entity causing discolouration identified.

Cannabinoids have been extensively described in the past for its use as a medicament to treat a variety of heath conditions. Over recent years, cannabinoid-based medicines have become increasingly available to patients in many countries as a pharmaceutical product. There are currently four commercially available cannabinoid-based drug products on the market. These are: dronabinol (Marinol®) which is a synthetic tetrahydrocannabinol (THC) used to treat anorexia in patients with AIDS and chemotherapy-induced nausea and vomiting; nabilone (Cesamet®) which is a synthetic cannabinoid and an analog of THC, used to treat chemotherapy-induced nausea and vomiting; nabiximols (Sativex®) a complex botanical mixture containing THC, CBD and other plant-derived cannabinoids and non-cannabinoids which is approved in Europe as a treatment for symptom improvement in adult patients with moderate to severe spasticity due to multiple sclerosis; and cannabidiol (Epidiolex®) which comprises botanically derived purified CBD, this is approved in the US for the treatment of seizures associated with Lennox-Gastaut syndrome, Dravet syndrome or tuberous sclerosis complex in patients 1 year or older.

Epidiolex was developed to provide treatment of seizures associated with Lennox-Gastaut syndrome (LGS) and Dravet Syndrome (DS), characterised in that the LGS and DS patients are deemed to be treatment-resistant on one or more anti-epileptic drugs (AEDs) (see WO 2019/97238 and WO 2016/203239). The drug product contains CBD of botanical origin that is purified to achieve a certain cannabinoid profile to allow for a higher therapeutic efficacy, in comparison to synthetic preparations of CBD which comprise no minor cannabinoid impurities and crude extracts which have higher levels of the minor cannabinoid impurities. This requires a careful, controlled method of preparation and purification in order to comply with the drug product's specification. WO 2019/207319 demonstrates the importance of using cannabis of botanical origin then purifying it, instead of simply using crude extracts.

Due to the above-outlined contemporary use of cannabinoids in medicine, this has necessitated finding more effective ways of manufacturing these cannabinoids, particularly in a stable form that presents consistent appearance and impurity profile.

The standard method of preparing CBD for use in pharmaceuticals is shown in FIG. 1 on the left-hand side. In brief, the process involves decarboxylation of milled CBD botanical raw material (BRM), followed by extraction with liquid $CO_2$ to produce crude CBD extract. This crude extract is then winterised to produce the refined extract, which itself is then crystallised to produce the CBD Active Pharmaceutical Ingredient (API). Thus, the standard process requires isolation of two types of CBD extract, crude and refined extract.

The process is detailed further in U.S. Pat. No. 10,583,096B2. Dried milled BRM is decarboxylated by heating to around 150° C. in a Decarboxylation Agitated Pan (DAP), to convert the naturally occurring cannabidiolic acid (CBDA) in the plant to the active CBD. This then undergoes extraction with liquid $CO_2$ at 60 bar/10° C. to produce unrefined CBD extract, containing around 60% to 80% w/w of CBD. The remainder of the extract is made up of various impurities including other cannabinoids, long chain alkanes, terpenes, sterols and triglycerides. Additional methods regarding the purification and characterisation of CBD preparations are disclosed and described in GB2548873 and GB2574321.

Winterisation involves precipitation of long chain waxy alkane impurities from a 2.0 volume solution of non-refined extract in ethanol. This is accomplished either by cooling to around −20° C. over 50 hours in the freezer or −15° C. to −25° C. over 4 hours using a temperature control unit. The precipitate is then removed by filtration. Removal of the last traces of ethanol from the extract can be difficult and time consuming. Levels of greater than 3% w/w ethanol in the refined extract can significantly impact crystallisation yield. Evaporator capacity and scale manageability necessitates splitting of extract batches for winterisation, leading to a bottleneck in the CBD manufacturing process.

Crystallisation is carried out from isolated refined extract. CBD API is crystallised from polished (hot filtered) extract solution in 2.0 volumes of n-heptane. The solution is seeded with 0.1% w/w of crystalline CBD at 12° C., allowing 2 hours for seed to initiate precipitation (propagate), before cooling the suspension very slowly (over 24 hours) to −18° C. to −20° C. The suspension is stirred at −18° C. to −20° C. for a further 24 hours to generate yield before filtration. Filtered solids are washed with 4×0.25 volume, short slurry and displacement washes (at −18° C. to −20° C. and 10° C.), along with a 30 minute, 10° C. re-slurry in 1.0 volume of solvent, totaling 2.0 volumes of heptane wash solvent.

Washed API is dried in an agitated filter dryer at 20° C. to 30° C. The overall crystallisation process is thus very long and there is a need to improve process efficiency and for a less complex, more efficient wash process that produces CBD of high purity and stability.

A number of publications have discussed the problem of cannabinoid discolouration.

U.S. Pat. No. 10,155,176B1 discloses a process for producing cannabinoid product optionally further containing an array of terpenes, flavonoids, and other phytoconstituents. It discloses using an adsorption and filtration system, notably without any winterisation nor crystallisation steps. It discusses pre-treatment with an adsorbent to remove impurities from the cannabinoid-containing extract feed. One such impurity it discusses is chlorophyll, which when removed from the feed, improves taste and produces a lighter coloured final product. The resulting cannabinoid product comprises 30%-95% cannabinoid. Stability tests have neither been disclosed nor mentioned.

U.S. Pat. No. 10,604,464B2 discloses crude cannabinoid extract being green in colour due to the presence of chlorophyll and using a decolouration zone to remove this, changing the colour of the extract from green to amber. This would necessitate an extra step in the manufacture process, decreasing process efficiency. The document does not provide any data on the long-term stability of the resulting compositions much less any short-term stability data.

There exists commercially available filter aids such as Florisil® that markets itself to remove pesticides from cannabis. It gives examples of various pesticides removed from cannabis extracts e.g. acephate, acetamiprid etc. Again, there is no disclosure of any cannabinoid stability data nor any data on the purity levels resulting from use of such filter aids.

Clearly there is a need for a more efficient, streamlined process to manufacture cannabinoids for use in pharmaceuticals that is both stable and substantially pure.

An object of the present invention was to provide an improved method of manufacturing cannabinoid-containing drug product. Such drug product would provide good stability of the cannabinoid active in order to be viable for drug development.

BRIEF SUMMARY OF THE DISCLOSURE

In accordance with a first aspect of the present invention there is provided stable substantially pure cannabinoid obtained by a process comprising:
 a) A decarboxylation step;
 b) An extraction step to produce crude extract; and
 c) A combined winterisation and crystallization step, wherein sub-steps comprise of:
  i) Precipitating alkanes in a solvent by cooling and removing them by filtration;
  ii) Removing the solvent by partial distillation;
  iii) Solvent exchanging into heptane;
  iv) Removing the remaining solvent by aqueous phase separation, resulting in a heptane solution;
  v) Heating the heptane solution and filtering it;
  vi) Cooling the solution whilst agitating at a constant speed;
  vii) Seeding the solution and propagating the seed, resulting in a suspension;
  viii) Cooling, stirring, filtering and washing the suspension, resulting in a product; and
  ix) De-liquoring and drying the product.

Preferably the cannabinoid may be selected from the group consisting of: cannabichromene (CBC), cannabichromenic acid (CBCV), cannabidiol (CBD), cannabidiolic acid (CBDA), cannabidivarin (CBDV), Cannabidiol-C1 (CBD-C1) also known as cannabidiorcol, Cannabidiol-C4 (CBD-C4) also known as nor-cannabidiol, cannabidiol-C6 (CBD-C6), cannabigerol (CBG), cannabigerol propyl variant (CBGV), cannabicyclol (CBL), cannabinol (CBN), cannabinol propyl variant (CBNV), cannabitriol (CBO), tetrahydrocannabinol (THC), tetrahydrocannabinolic acid (THCA), tetrahydrocannabivarin (THCV) and tetrahydrocannabivarinic acid (THCVA).

More preferably the cannabinoid is cannabidiol (CBD).

In a further aspect of the invention, the extraction step is carried out using liquid $CO_2$ at a temperature of 25° C. and pressure of 100 bar.

Preferably the winterisation step uses methanol as a solvent.

Preferably the winterisation step is carried out at a temperature between 0° C. to 5° C.

Preferably the aqueous phase separation consists of less than three aqueous washes.

In a further aspect of the invention, the winterisation step uses a filter aid that does not contain vanadium.

Preferably the winterisation step uses an alternative filter aid.

Alternatively, the winterisation step does not use a filter aid.

In a further aspect of the invention, a chelating agent is used in the solvent exchange. Preferably the chelating agent is citric acid.

In a further aspect of the invention one or more antioxidants are added.

Preferably the one or more antioxidants is citric acid or ascorbyl palmitate.

In a further aspect of the invention, the CBD has a purity of >95%, preferably greater than 96% (w/w), more preferably 97% (w/w), more preferably still 98% (w/w), and most preferably 99% (w/w) and greater.

Preferably THC is present at less than 0.15%.

Preferably CBDV is present at up to 1%.

In accordance with a second aspect of the present invention there is provided a process comprising:
 a) A decarboxylation step of cannabidiol (CBD) botanical raw material;
 b) An extraction step of step (a) reaction mixture to produce crude extract; and
 c) A combined winterisation and crystallization step of the crude extract of step (b), wherein sub-steps comprise:
  i) Precipitating alkanes in a solvent of the crude extract of step (b) by cooling and removing the alkanes by filtration;
  ii) Removing the solvent of sub-step (i) reaction mixture by partial distillation;
  iii) Solvent exchanging sub-step (ii) reaction mixture into heptane;
  iv) Removing the remaining solvent of sub-step (iii) reaction mixture by aqueous phase separation, resulting in a heptane solution;
  v) Heating the heptane solution of sub-step (iv) and filtering it;
  vi) Cooling sub-step (v) reaction mixture whilst agitating at a constant speed;
  vii) Seeding sub-step (vi) reaction mixture and propagating the seed, resulting in a suspension;
  viii) Cooling, stirring, filtering and washing the suspension of sub-step (vii); and ix) De-liquoring and drying sub-step (viii) reaction material to obtain stable substantially pure cannabinoid.

BRIEF DESCRIPTION OF THE DRAWINGS

Embodiments of the invention are further described hereinafter with reference to the accompanying drawings, in which.

DEFINITIONS

Figure 1:
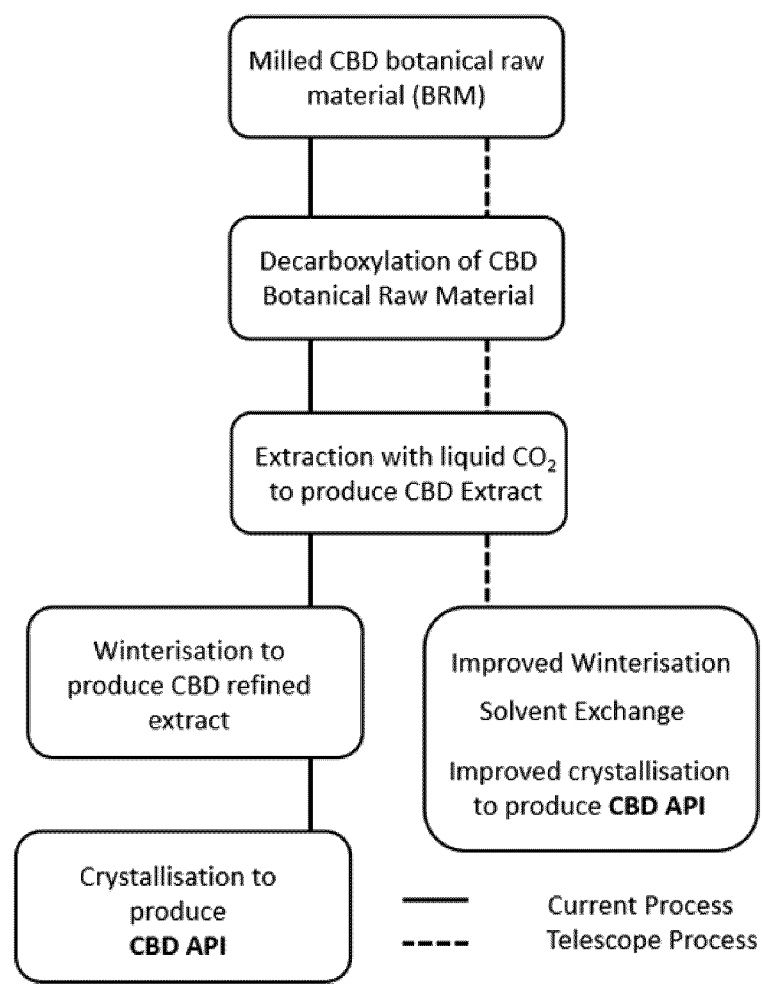
FIG. 1 shows a graphical comparison of non-telescoped and telescoped processes.

Definitions of some of the terms used to describe the invention are detailed below:

A "substantially pure" cannabinoid is defined as a cannabinoid which is present at greater than 95% (w/w) pure. More preferably greater than 96% (w/w), more preferably 97% (w/w), more preferably 98% (w/w), most preferably 99% (w/w) and greater.

"Process A" is used to describe the standard, non-telescoped process.

"Process B" is used to describe the presently claimed telescoped process.

An "alternative filter aid" is used to describe the following filter aids: Harborlite 800 (Fisher) and Celpure (Imerys Filtration).

The cannabinoids described in the present application are listed below along with their standard abbreviations.

TABLE 1

Cannabinoids and their abbreviations

| CBC | Cannabichromene | 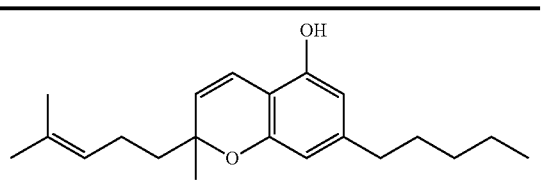 |
| --- | --- | --- |
| CBCV | Cannabichromenic acid | 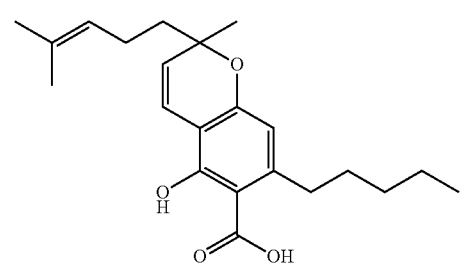 [SMILES: CCCCCc1cc2c(c(O)c1C(=O)O)C=CC(C)(CCC=C(C)C)O2] |

TABLE 1-continued

Cannabinoids and their abbreviations

| CBE | Cannabielsoin |
| CBD | Cannabidiol |
| CBDA | Cannabidiolic acid |
| CBDV | Cannabidivarin |
| CBDVA | Cannabidivarinic acid |
| CBD-C1 | Cannabidiol-C1 |

TABLE 1-continued
Cannabinoids and their abbreviations
| | | |
|---|---|---|
| CBD-C4 | Cannabidiol-C4 | 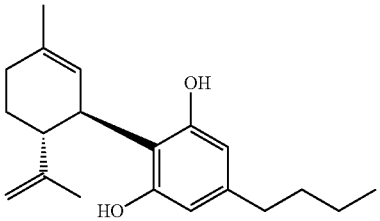 [SMILES: C=C(C)[C@@H]1CCC(C)=C[C@H]1c1c(O)cc(CCCC)cc1O] |
| CBD-C6 | Cannabidiol-C6 | 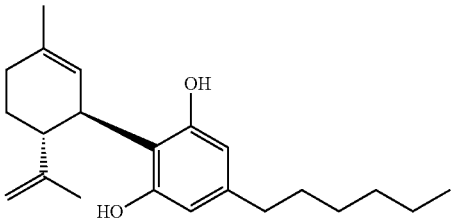 [SMILES: C=C(C)[C@@H]1CCC(C)=C[C@H]1c1c(O)cc(CCCCCC)cc1O] |
| CBG | Cannabigerol | 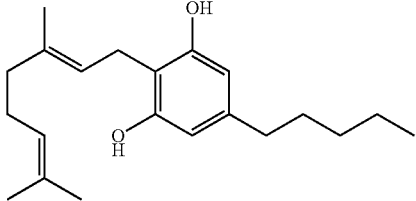 [SMILES: CCCCCc1cc(O)c(C/C=C(\C)CCC=C(C)C)c(O)c1] |
| CBL | Cannabicyclol | 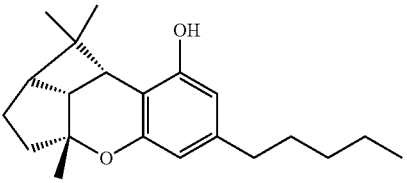 |
| CBN | Cannabinol | 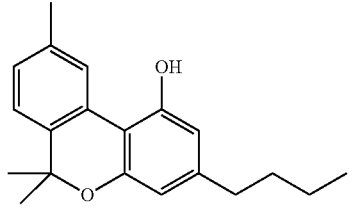 [SMILES: CCCCc1cc(O)c2c(c1)OC(C)(C)c1ccc(C)cc1-2] |
| CBO | Cannabitriol | 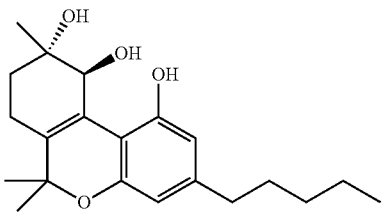 [SMILES: CCCCCc1cc(O)c2c(c1)OC(C)(C)C1=C2[C@H](O)[C@@](C)(O)CC1] |
| THC | Tetrahydrocannabinol | 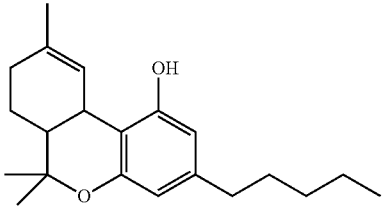 [SMILES: CCCCCc1cc(O)c2c(c1)OC(C)(C)C1CCC(C)=CC21] |

TABLE 1-continued

Cannabinoids and their abbreviations

| THCA | Tetrahydrocannabinolic acid |
| THCV | Tetrahydrocannabivarin |
| THCVA | Tetrahydrocannabivarinic acid |

Active Pharmaceutical Ingredients

There are many known cannabinoids and the process according to the present invention may be used to produce stable and substantially pure cannabinoids. Such cannabinoids may be selected from the group consisting of: cannabichromene (CBC), cannabichromenic acid (CBCV), cannabidiol (CBD), cannabidiolic acid (CBDA), cannabidivarin (CBDV), Cannabidiol-C1 (CBD-C1) also known as cannabidiorcol, Cannabidiol-C4 (CBD-C4) also known as nor-cannabidiol, cannabidiol-C6 (CBD-C6), cannabigerol (CBG), cannabigerol propyl variant (CBGV), cannabicyclol (CBL), cannabinol (CBN), cannabinol propyl variant (CBNV), cannabitriol (CBO), tetrahydrocannabinol (THC), tetrahydrocannabinolic acid (THCA), tetrahydrocannabivarin (THCV) and tetrahydrocannabivarinic acid (THCVA). This list is not exhaustive and merely details the cannabinoids which are identified in the present application for reference. So far, over 100 different cannabinoids have been identified and these cannabinoids can be split into different groups as follows: Phytocannabinoids; Endocannabinoids; and Synthetic cannabinoids.

The process according to the present invention may also be used to produce stable and substantially pure cannabinoids as disclosed in Handbook of Cannabis, Roger Pertwee, Chapter 1, pages 3 to 15.

Thus, the process according to the present invention can be used to produce all cannabinoids but is exemplified using CBD.

DETAILED DESCRIPTION OF THE INVENTION

Extraction

Extraction efficiency of decarboxylated CBD BRM was improved due to increased bulk density from pelleting and milling the material prior to decarboxylation. This increase in bulk density allowed an increase in loading weight whilst reducing the total volume of $CO_2$ per kg of BRM and was shown to obtain a high yielding CBD extract. In one full scale batch derived from pelleted BRM and extracted using 55 kg $CO_2$/kg decarboxylated BRM, this gave good extraction efficiency (~90%) and a high product assay (74%). Extraction efficiency was improved by increasing temperature and pressure (60 bar, 10° C. to 100 bar, 25° C.).

Telescoped Winterisation and Solvent Exchange

Alkane impurities are precipitated from a 2.0 volume solution of non-refined extract in methanol, upon cooling to 0° C. to 5° C. (winterisation). Methanol is removed by partial distillation, then following solvent exchange into n-heptane, the remaining methanol is removed by aqueous phase separation (water wash), see FIG. 1.

Winterisation Solvent

In head to head (2.0 volume, 60 minute, 20° C.) winterisation experiments, methanol winterisation was comparable to that from ethanol, with both solvents resulting in low levels of alkanes (0.03% w/w) in the refined extract, see Table 2. Methanol was easily removed post-winterisation by distillation and aqueous separation (wash), thus minimising impact on the crystallisation yield.

The experiment was performed on 20 g of extract and the material refined for 1 hour at ambient temperature. Following filtration a sample was taken of the filtrate for alkane analysis. The results showed that in both instances the level of the alkanes was very low even at ambient temperature and a stir duration of 1 hour, significantly shorter than process A. These solutions were distilled to dryness to isolate the refined extract and taken into crystallisation. The isolated material was then analysed for alkane levels. Table 2 shows the alkane content taken of the batch solution prior to crystallisation and the subsequent isolated final product by chromatography.

TABLE 2

Comparison of ethanol and methanol for the refinement process (% w/w)

| Sample | Heptacosane | Octacosane | Nonacosane | Triacontane | Hentriacontane | Stigmasterol |
|---|---|---|---|---|---|---|
| Ethanol | | | | | | |
| Refined extract | 0.0115 | 0.0039 | 0.0079 | 0.0021 | 0.0046 | 0.0055 |
| Final product | 0.0006 | 0.0001 | 0.0008 | 0.0004 | 0.0003 | 0.0003 |
| Methanol | | | | | | |
| Refined extract | 0.0078 | 0.0017 | 0.0063 | 0.0014 | 0.0048 | 0.0045 |
| Final product | 0.0052 | 0.0004 | 0.0017 | 0.0006 | 0.0009 | 0.0012 |

The data indicated that methanol is a more efficient solvent in removing the alkanes. Although the final product analysis showed lower levels in material isolated from the ethanol refinement, the levels from methanol refinement were also extremely low and due to preference of methanol for plant manufacture, being cheaper and on bulk supply, methanol was chosen as the solvent.

Winterisation Temperature

Figure 2:
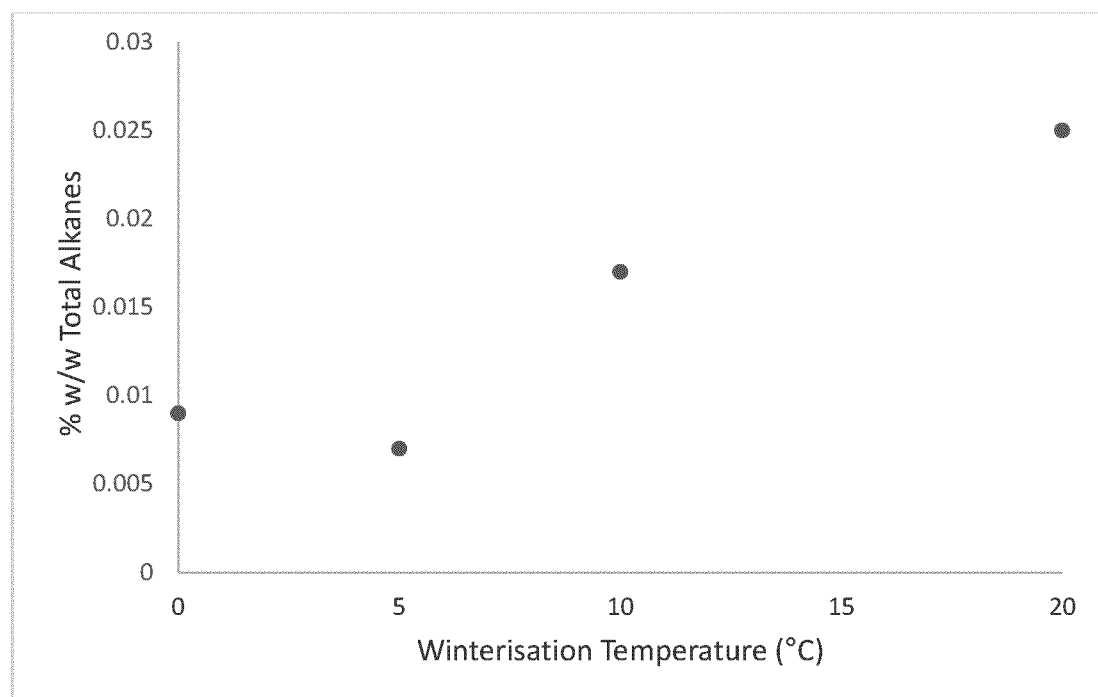
FIG. 2 shows a plot of total alkane levels in the winterised extract, following winterisation at different temperatures.

A series of winterisation experiments were carried out at different temperatures, filtering through a liquid bag filtration system (GAF® bag) at the experimental winterisation temperature. Low levels of alkanes were obtained for all resulting refined extract samples (≤0.25% w/w). The lowest alkane levels were obtained from winterisations at 0° C. to 5° C. (see FIG. 2).

Alkane Cake Washes

Post-filtration of methanol solution, the alkane cake was washed with cold (0° C. to 5° C.) methanol to remove traces of retained CBD. Filtration of liquors was reported to be faster when 2.0 volumes of wash solvent was split into 0.5 volume washes (as opposed to one larger wash). Each wash was added to the alkane before the cake dried out and cracked.

Filter Aid

A filter aid was used to aid alkane filtration as this would significantly reduce filtration time, particularly on a bigger manufacturing scale.

Solvent Exchange

Figure 3:
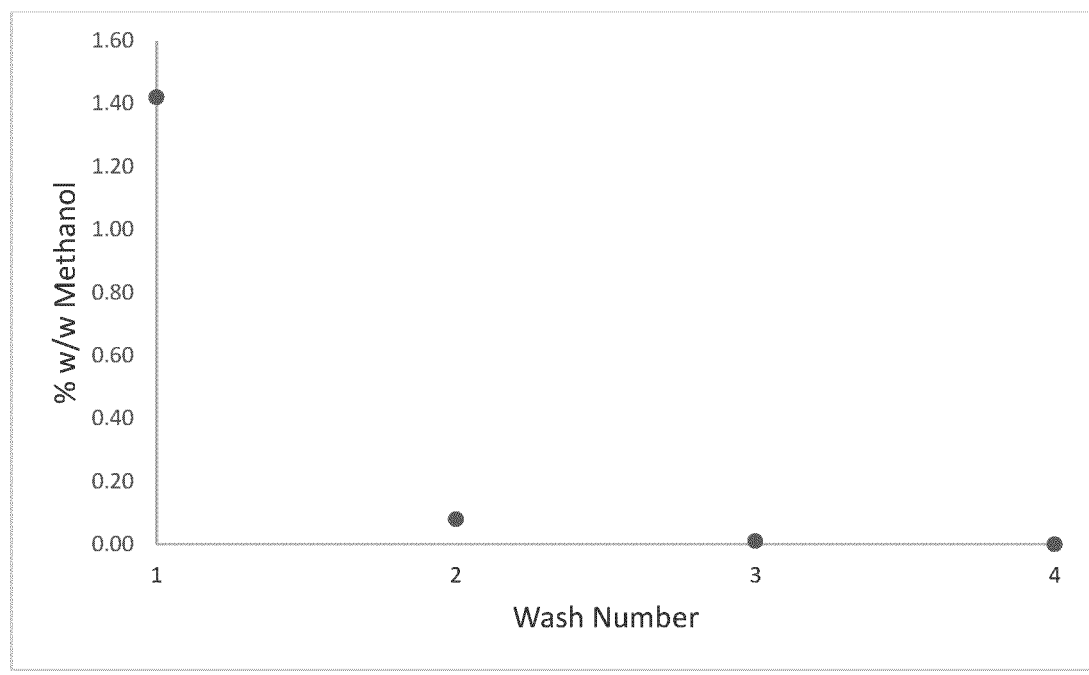
FIG. 3 shows a plot of % w/w residual methanol remaining in heptane solution after successive aqueous washes.

Post-winterisation, methanol was effectively removed by partial distillation and partitioning into an aqueous phase (water wash). After distillation, methanol solution was solvent exchanged into n-heptane, mixing vigorously with 2.0 volumes of purified water. The aqueous layer (containing methanol) was separated from the organic phase and removed. This resulted in typically very low levels of methanol in the resulting heptane solution, which was taken through to the crystallisation step. Methanol was shown to be reduced to a level of <0.5% w/w after the second aqueous wash and to very low levels after the third wash (see FIG. 3). This suggested that three aqueous washes would be more than adequate.

Modified Crystallisation

A modified crystallisation process was proposed, to improve process efficiency. The cooling period (from the seeding temperature to the −18° C. to −20° C. isolation temperature) was successfully reduced from 24 hours to 16 hours, without detrimental impact on particle size. The −18° C. to −20° C. stir out period was reduced from 24 hours to 6 hours, without impact on yield. Seed propagation time was reduced from 120 minutes to 45 minutes.

Complexity of the wash process was reduced by removing the displacement washes. Wash efficiency was further improved by increasing individual wash volumes (for better wetting of the cake). The number of washes was reduced from five to three, keeping the total wash volume at 2.0 volumes. The modified crystallisation process reduced crystallisation time by around 24 hours on plant.

Discolouration of Drug Product

A colour difference was observed in CBD drug product using CBD API manufactured from Process B (Telescoped) route compared to CBD drug product using CBD API manufactured from Process A (non-telescoped) route.

A stability study to analyse two process A and two process B drug products was conducted to assess the difference in colour. Process A results would act as a control when assessing process B drug product batches. The conditions were similar to an "in-use" study wherein one amber bottle with a screw cap lid of drug product was manufactured for each batch, stored at ambient temperatures (laboratory temperatures maintained at 20° C.±5° C. to simulate commercial storage) and opened for sample preparation for testing. The same bottle was then reopened at the designated timepoints. Testing was performed over a 55 day period using testing methods of appearance and colourimetry.

Figure 4:
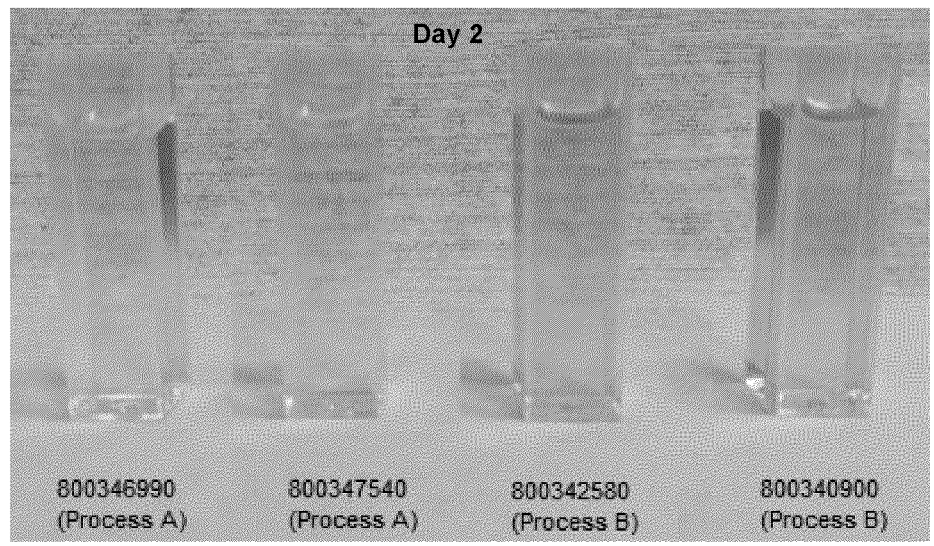
FIG. 4 shows appearance of process A drug product against process B drug product after 2 days and 55 days. The API batches to be formulated into drug product were 800346990 and 800347540 to represent process A (control), and batches 800342580 and 800340900 to represent process B.
Figure 4:
Figure 4:
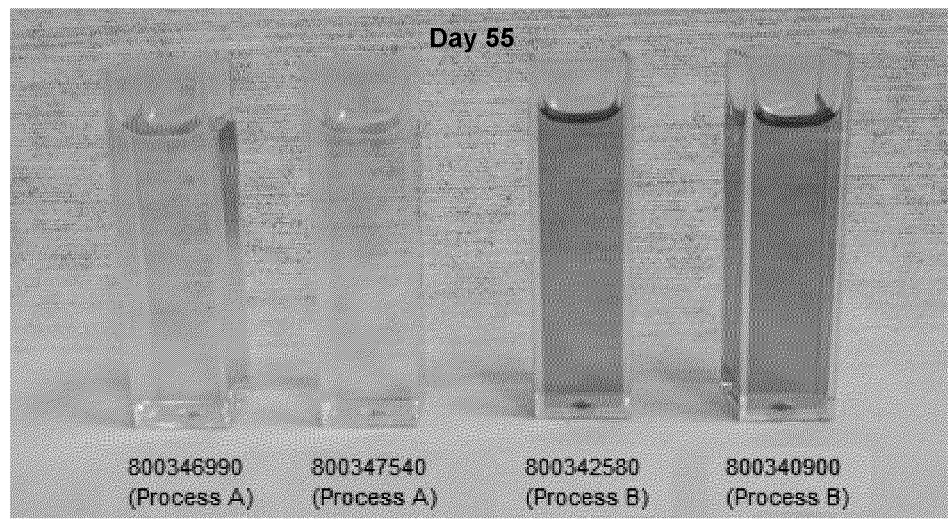
Figure 5:
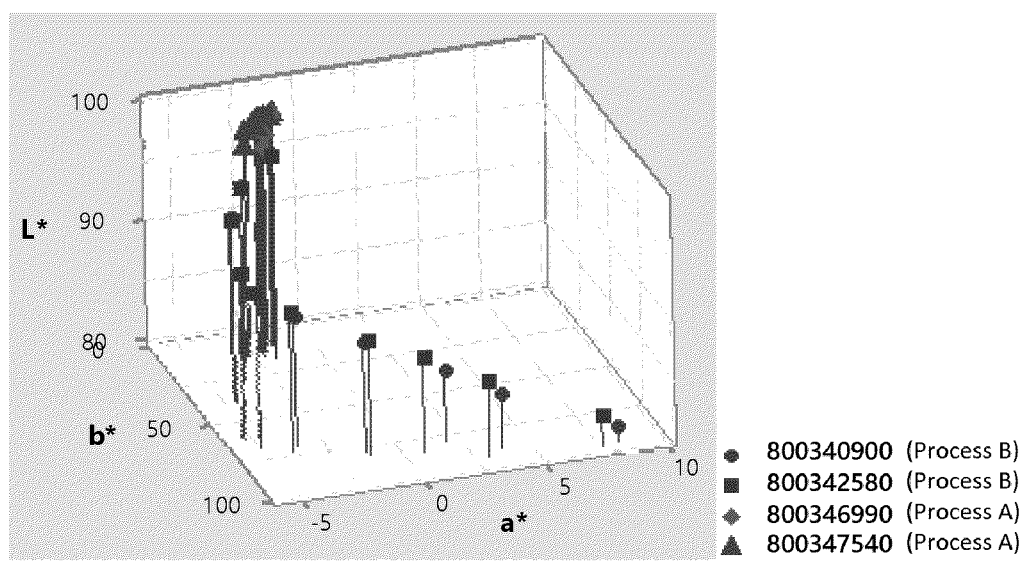
FIG. 5 shows a 3-D scatterplot of tabulated results to show the change in colour of Process A and Process B drug product over a 55-day period. Significant difference is observed in trend between the two different drug products.

At the initial timepoint, the solutions of both processes A and B appeared as a clear, colourless to yellow colour. After 2 days the solutions of process B were notably more yellow, in comparison to the solutions of process A which stayed a clear to yellow colour, see FIG. 4. Over time the solutions of process B were a deeper yellow colour and after 55 days a yellow to slightly orange colour. This change in colour for solutions of process B over the 55 day time period is documented in FIG. 5.

Stability results over 55 days were recorded for process A drug product (Batch 800347540) shown in Table 3.1, and process B drug product (Batch 800340900), shown in Table 3.2. Visual appearance of the solutions was noted as well as degradant and CBD concentrations using UPLC (Ultra-performance liquid chromatography) assay. The results confirm visual findings from FIG. 4 and colourimetry data from FIG. 5 whereby process B drug product was found to change colour to a slightly orange colour over a 55-day time period. As can be seen from Table 3.2, colour change was noticeable from 20 days for process B drug product, whereas process A drug product remained a clear colourless to yellow solution (see Table 3.1). In addition, it was found that THC concentration and total degradant concentration exceeded the specification limit from 30 days and at 55 days respectively for process B drug product (see Table 3.2).

TABLE 3.1

Stability results of process A drug product: Batch 800347540 (Process A) results for Appearance and UPLC Assay

| Time (Day) | Visual Appearance | UPLC Assay TM-170 Concentration (mg/ml) | | | | | | | | |
| --- | --- | --- | --- | --- | --- | --- | --- | --- | --- | --- |
| | | CBD | CBD-C1 | CBE II | OH-CBD | CBDV | CBE I | CBD-C4 | THC | Total Degs |
| Spec. Limits | A clear, colourless to yellow solution | 95.0-105.0 | N/A | NMT 0.20 | NMT 0.20 | N/A | NMT 0.20 | N/A | NMT 0.20 | NMT 0.50 |
| 0 | A clear colourless to yellow solution | 98.96 | 0.07 | 0.00 | 0.03 | 0.35 | 0.00 | 0.30 | 0.04 | 0.10 |
| 1 | A clear colourless to yellow solution | 98.76 | 0.07 | 0.00 | 0.03 | 0.35 | 0.00 | 0.30 | 0.04 | 0.09 |
| 2 | A clear colourless to yellow solution | 98.90 | 0.07 | 0.00 | 0.03 | 0.35 | 0.00 | 0.30 | 0.04 | 0.10 |
| 6 | A clear colourless to yellow solution | 98.42 | 0.05 | 0.00 | 0.03 | 0.35 | 0.00 | 0.29 | 0.04 | 0.10 |
| 9 | A clear colourless to yellow solution | 98.46 | 0.07 | 0.00 | 0.03 | 0.35 | 0.00 | 0.29 | 0.04 | 0.10 |
| 12 | A clear colourless to yellow solution | 98.56 | 0.07 | 0.00 | 0.03 | 0.34 | 0.00 | 0.29 | 0.04 | 0.10 |
| 15 | A clear colourless to yellow solution | 98.33 | 0.07 | 0.00 | 0.03 | 0.34 | 0.01 | 0.29 | 0.04 | 0.11 |
| 20 | A clear colourless to yellow solution | 98.65 | 0.07 | 0.00 | 0.03 | 0.35 | 0.01 | 0.29 | 0.04 | 0.11 |
| 30 | A clear colourless to yellow solution | 98.88 | 0.07 | 0.00 | 0.03 | 0.35 | 0.00 | 0.29 | 0.04 | 0.10 |
| 55 | A clear colourless to yellow solution | 99.01 | 0.07 | 0.00 | 0.03 | 0.35 | 0.01 | 0.31 | 0.05 | 0.13 |

TABLE 3.2

Stability results of process B drug product: Batch 800340900 (Process B) results for Appearance and UPLC Assay

| Time (Day) | Visual Appearance | UPLC Assay TM-170 Concentration (mg/ml) | | | | | | | | |
| --- | --- | --- | --- | --- | --- | --- | --- | --- | --- | --- |
| | | CBD | CBD-C1 | CBE II | OH-CBD | CBDV | CBE I | CBD-C4 | THC | Total Degs |
| Spec. Limits | A clear, colourless to yellow solution | 95.0-105.0 | N/A | NMT 0.20 | NMT 0.20 | N/A | NMT 0.20 | N/A | NMT 0.20 | NMT 0.50 |
| 0 | A clear colourless to yellow solution | 98.17 | 0.09 | 0.00 | 0.03 | 0.32 | 0.00 | 0.32 | 0.04 | 0.11 |
| 1 | A clear colourless to yellow solution | 97.98 | 0.09 | 0.00 | 0.03 | 0.32 | 0.00 | 0.32 | 0.05 | 0.14 |
| 2 | A yellow solution | 97.84 | 0.10 | 0.01 | 0.03 | 0.32 | 0.00 | 0.32 | 0.07 | 0.17 |
| 6 | A yellow solution | 97.84 | 0.07 | 0.00 | 0.03 | 0.32 | 0.01 | 0.32 | 0.10 | 0.24 |
| 9 | A yellow solution | 97.34 | 0.10 | 0.00 | 0.03 | 0.32 | 0.01 | 0.32 | 0.13 | 0.26 |
| 12 | A yellow solution | 97.24 | 0.10 | 0.00 | 0.03 | 0.32 | 0.01 | 0.31 | 0.14 | 0.30 |
| 15 | A yellow solution | 96.95 | 0.10 | 0.01 | 0.03 | 0.32 | 0.02 | 0.31 | 0.18 | 0.36 |
| 20 | A yellow solution, slightly orange | 97.24 | 0.10 | 0.01 | 0.02 | 0.32 | 0.03 | 0.32 | 0.17 | 0.40 |
| 30 | A yellow solution, slightly orange | 96.85 | 0.10 | 0.01 | 0.02 | 0.32 | 0.04 | 0.31 | 0.21 | 0.49 |
| 55 | A yellow solution, slightly orange | 96.39 | 0.1 | 0.05 | 0.04 | 0.32 | 0.11 | 0.33 | 0.28 | 0.82 |

Figure 6:
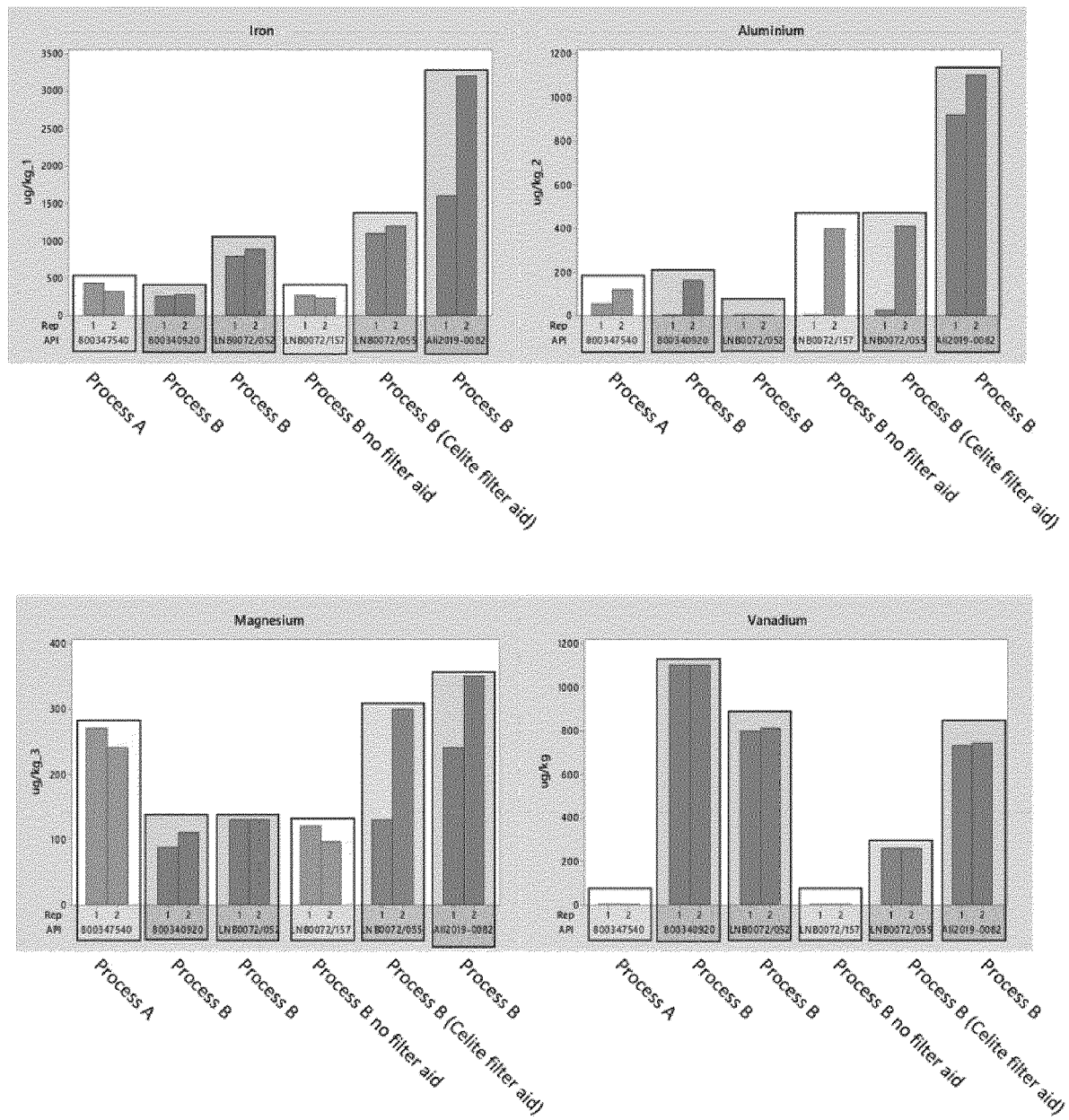
FIG. 6 shows graphical results of elemental analysis for trace metals iron, aluminium, magnesium and vanadium. Yellow boxes represent process A API and telescoped process with no filter aid API, green box is telescoped process API using celite filter aid and red boxes are representative telescoped process API.

Filter aids have different levels of trace elements according to specifications from their manufacturers. Different API samples were submitted for elemental analysis, shown in FIG. 6. The data shows surprisingly elevated levels of vanadium in telescoped process API, whilst there are low levels present in process A API.

Figure 7:
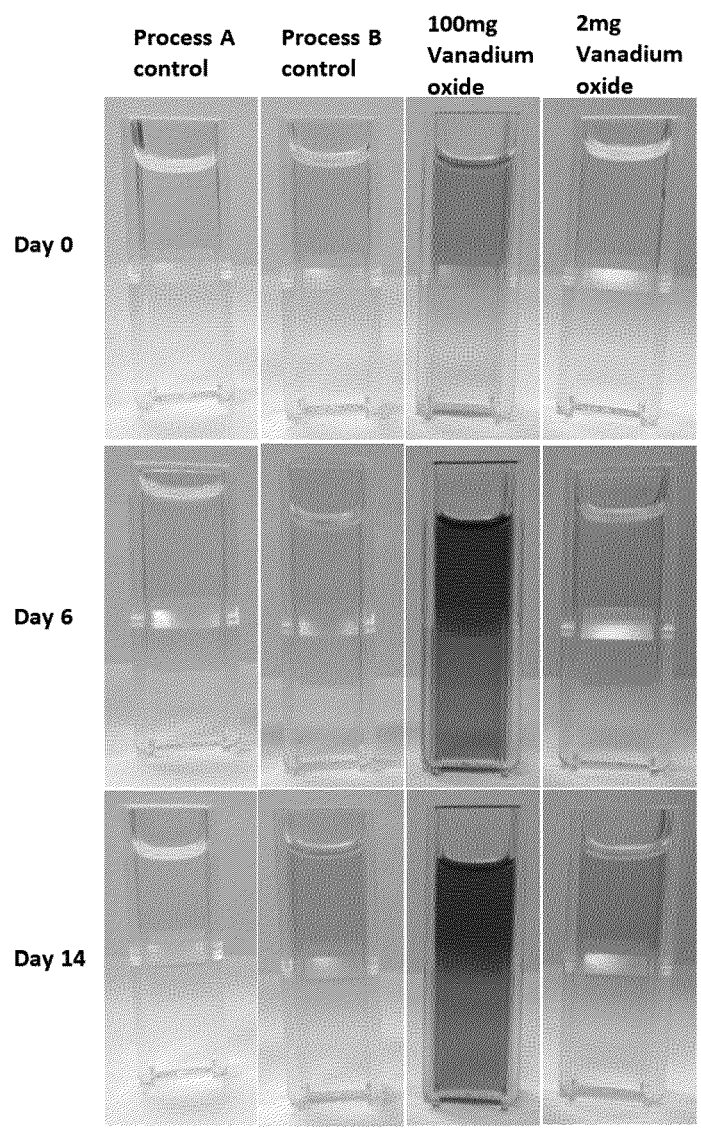
FIG. 7 shows the visual appearance of the higher and lower vanadium spiked experiments compared to positive and negative control of Process A and B during the spiking experiment. Lower spike vanadium oxide follows the colour change of the process B control over a 14 day period.
Figure 8:
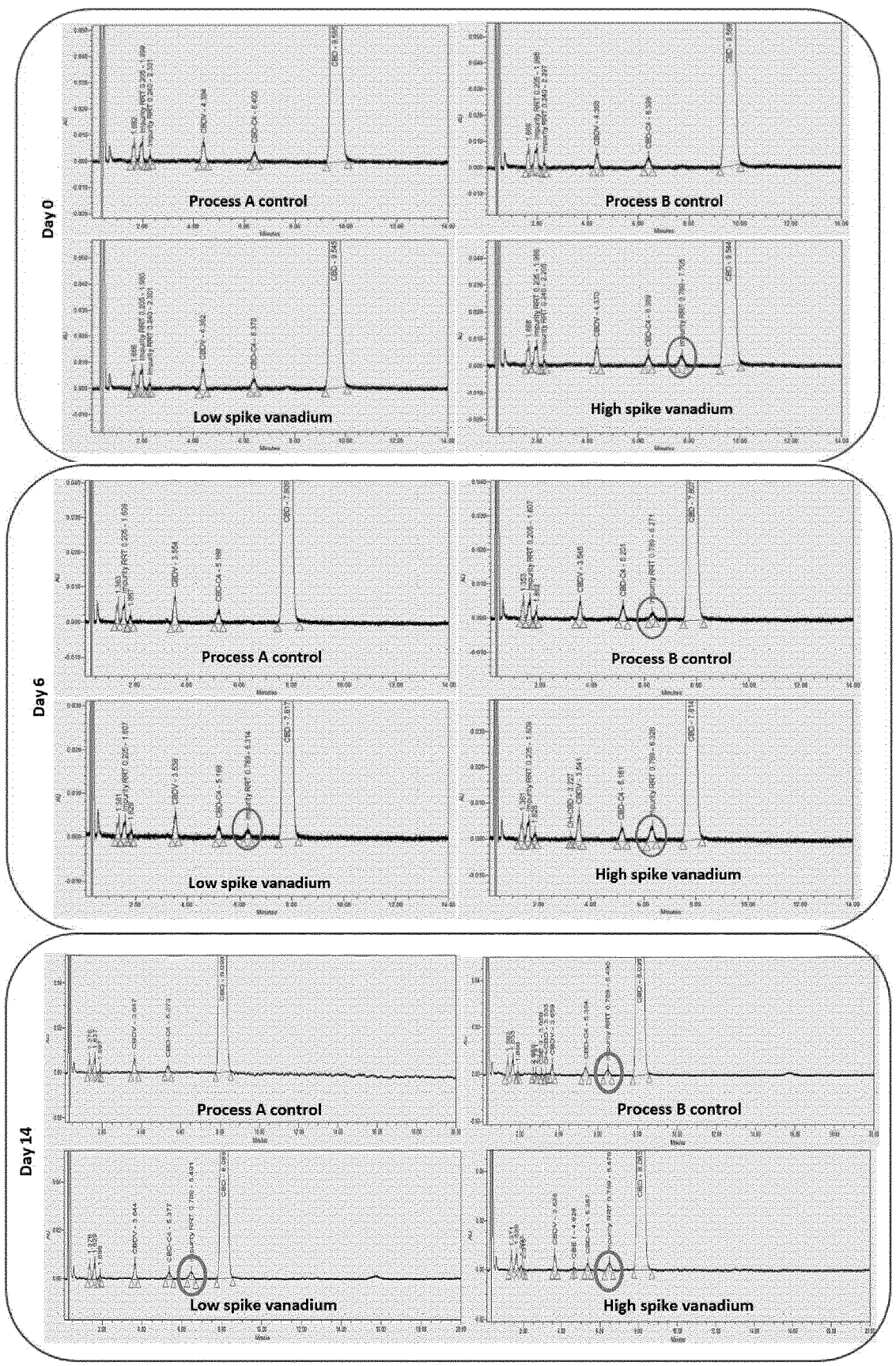
FIG. 8 shows chromatograms to illustrate the impurity growth of RRT 0.79 in the low spiked vanadium oxide and process B control in the spiking experiment. Impurity peak is outlined in a red circle.

A further screening experiment was conducted using vanadium oxide to assess any potential impact of this element. A high spike (100 mg) and a low spike (2 mg) of vanadium oxide was added to a 100 mL ethanol solution containing 10 g of Process A representative material. Both Process A and Process B controls were run at part of the spiking experiment. The results of this screening experiment, visual appearance and impurity profiles, are shown in FIGS. 7 and 8. FIG. 7 showed that the low vanadium spiked sample matched the colour change observed within process B material. The chromatograms of FIG. 8 showed that the increase of impurities of the low spike over a 14 day period matched those from process B control. In particular, the same impurity (circled in red) was recorded for the low and high spiked vanadium oxide and process B control. With the higher vanadium spike experiment, this impurity is also present at Day 0, indicating an accelerated degradation with higher levels of vanadium oxide. The data presented here shows that vanadium could be a key contributor of the colour change in this investigation, particularly at low levels.

Figure 9:
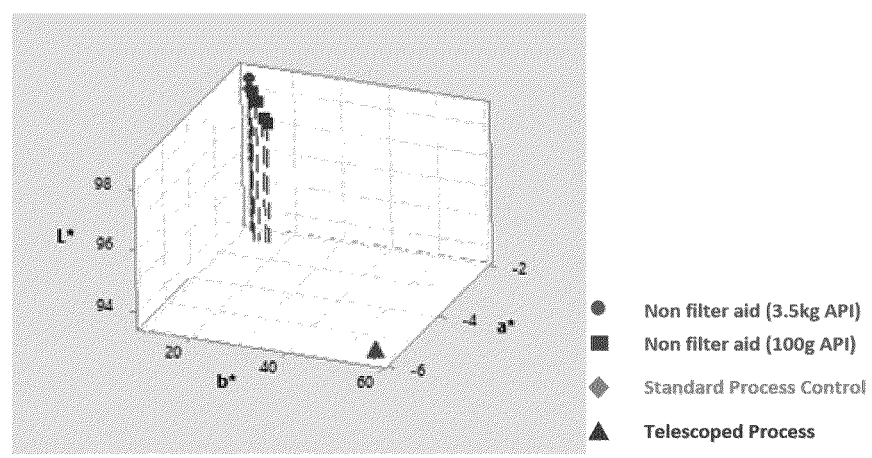
FIG. 9 shows a 3-D scatterplot of colourimetry results for non-filter aid API compared to telescoped process API and control process A API.

One solution to correct the observed colour change was to not use any filter aid in the winterisation process. Indeed, colour change was inhibited when a filter aid was not used during the telescoped process in FIG. 9. However, removal of the filter aid significantly increased the time taken for the filtration process.

Figure 10:
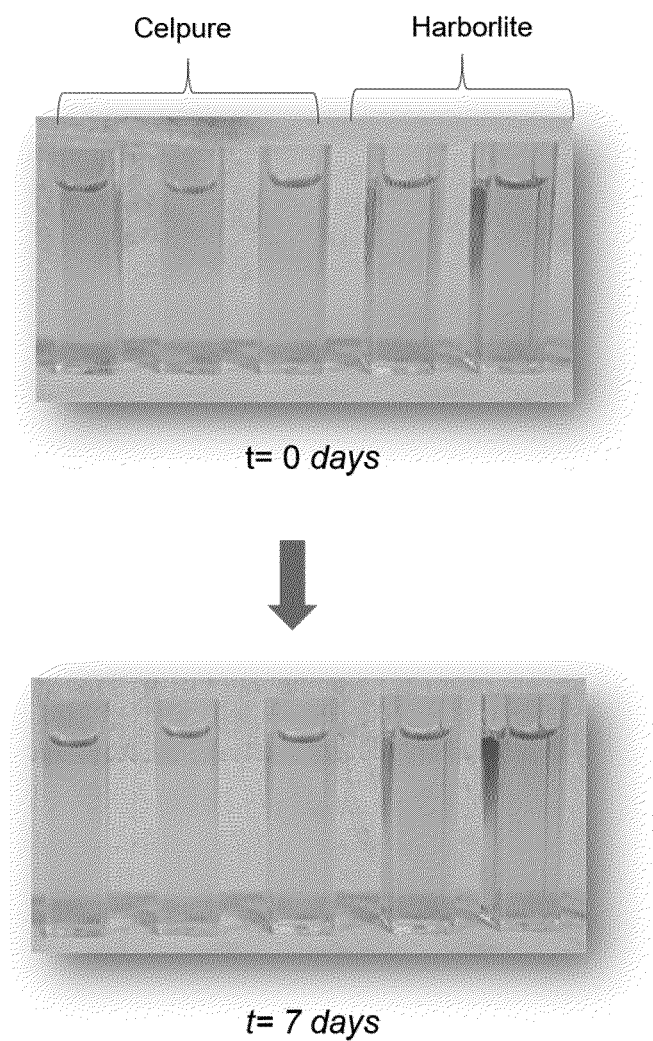
FIG. 10 shows drug product resulting from using alternative filter aids at initial timepoint (0 days) and second timepoint (7 days).

Alternatively, different filter aids were evaluated to assess the impact on the colour of drug product. Celpure and Harborlite were preferred options for alternative filter aids as the visual appearance of the drug product have been shown to be similar to process A drug product, see FIG. 10 compared to FIG. 4.

The following non-limiting examples are provided to further illustrate the present invention.

Example 1: Evaluation of API Using No Filter Aid and Alternative Filter Aids API manufactured with the use of no filter aid and alternative filter aids (Celpure and Harborlite) were analysed to test against specification. API material was analysed for appearance, CBD assay and impurity testing conducted using liquid chromtography (LC) TM-170, see Table 4. The results of all API (4 batches with no filter aid and 2 with alternative filter aid) show compliance with respect to specification criteria.

Example 2: Evaluation of Drug Product Using API Manufactured with No Filter Aid and Alternative Filter Aids Drug product was formulated using API from different manufacturing streams. These streams differed only in the winterisation step, in particular the filtration step, with either no filter aid or alternative filter aids. The alternative filter aids assessed were Celpure and Harborlite. Three different batches of API using Celpure filter aid were manufactured, two batches of Harborlite, and four batches using no filter aid, of which corresponding drug products were analysed (see Tables 5.1 and 5.2). The 7-day stability test would indicate whether the drug product behaves within specification limits in terms of colour and impurity profile. Analysis was also conducted at day 35, to see the stability at ambient conditions of this drug product over a longer time period to reassure stability of the drug product.

TABLE 4

Analysis of API manufactured with no filter aid or alternative filter aids.

| Test | Specification | Results (% w/w) | | | | | |
| --- | --- | --- | --- | --- | --- | --- | --- |
| | | No filter aid 1 | No filter aid 2 | No filter aid 3 | No filter aid 4 | Harborlite filter aid | Celpure filter aid |
| 1. Appearance | White/off-white to pale yellow powder | Complies | Complies | Complies | Complies | Complies | Complies |
| 2. CBD Assay | 98.0-102.0% | 98.8 | 98.7 | 98.7 | 98.9 | 98.7 | 98.7 |
| 3. Impurities (other cannabinoids): | | | | | | | |
| CBD-C1 | NMT 0.15% w/w | 0.09 | 0.09 | 0.12 | 0.09 | 0.09 | 0.09 |
| CBDV | NMT 0.80% w/w | 0.50 | 0.40 | 0.35 | 0.41 | 0.41 | 0.40 |
| CBD-C4 | NMT 0.50% w/w | 0.32 | 0.36 | 0.35 | 0.36 | 0.36 | 0.36 |
| THC | NMT 0.10% w/w | 0.03 | 0.03 | 0.05 | 0.03 | 0.03 | 0.04 |
| Indiv. unspecified impurities | NMT 0.10% w/w | 0.04 | 0.04 | 0.05 | 0.04 | 0.04 | 0.04 |
| Total unspecified impurities | NMT 0.30% w/w | 0.11 | 0.11 | 0.12 | 0.11 | 0.11 | 0.11 |
| Total impurities | NMT 1.5% w/w | 1.05 | 0.99 | 0.99 | 1.01 | 1.01 | 1.00 |
| 4. Residual Solvents: | | | | | | | |
| Heptane | NMT 0.50% w/w | 0.07 | 0.07 | 0.07 | 0.07 | 0.07 | 0.07 |
| Methanol | NMT 0.30% w/w | <0.01 | <0.01 | <0.01 | <0.01 | <0.01 | <0.01 |

TABLE 5.1

Stability results for the analysis of drug product manufactured with no filter aid.

| | | | TM-170 Concentration (mg/ml) | | | | | | | | |
|---|---|---|---|---|---|---|---|---|---|---|---|
| Batch | Time (Day) | Visual Appearance | CBD | CBD-C1 | CBE II | OH-CBD | CBDV | CBE I | CBD-C4 | THC | Total Degs |
| Spec. Limits | | A clear, colourless to yellow solution | 95.0-105.0 | N/A | NMT 0.20 | NMT 0.20 | N/A | NMT 0.20 | N/A | NMT 0.20 | NMT 0.50 |
| No filter aid 1 | 0 | A clear colourless to yellow solution | 99.21 | 0.13 | 0.00 | 0.04 | 0.35 | 0.00 | 0.35 | 0.04 | 0.14 |
| | 7 | A clear colourless to yellow solution | 99.19 | 0.13 | 0.00 | 0.05 | 0.35 | 0.00 | 0.35 | 0.04 | 0.15 |
| | 35 | A clear colourless to yellow solution | 99.03 | 0.14 | 0.00 | 0.04 | 0.35 | 0.01 | 0.34 | 0.06 | 0.19 |
| No filter aid 2 | 0 | A clear colourless to yellow solution | 99.22 | 0.10 | 0.00 | 0.04 | 0.41 | 0.00 | 0.35 | 0.03 | 0.12 |
| | 7 | A clear colourless to yellow solution | 99.61 | 0.10 | 0.00 | 0.04 | 0.41 | 0.00 | 0.36 | 0.03 | 0.12 |
| | 35 | A clear colourless to yellow solution | 99.44 | 0.10 | 0.00 | 0.01 | 0.41 | 0.02 | 0.35 | 0.05 | 0.19 |
| No filter aid 3 | 0 | A clear colourless to yellow solution | 99.83 | 0.10 | 0.00 | 0.04 | 0.51 | 0.00 | 0.31 | 0.03 | 0.13 |
| | 7 | A clear colourless to yellow solution | 99.91 | 0.09 | 0.00 | 0.04 | 0.51 | 0.00 | 0.31 | 0.04 | 0.12 |
| | 35 | A clear colourless to yellow solution | 99.67 | 0.10 | 0.00 | 0.03 | 0.50 | 0.02 | 0.30 | 0.05 | 0.17 |
| No filter aid 4 | 0 | A clear colourless to yellow solution | 99.10 | 0.10 | 0.00 | 0.04 | 0.40 | 0.00 | 0.36 | 0.03 | 0.13 |
| | 7 | A clear colourless to yellow solution | 99.55 | 0.09 | 0.00 | 0.04 | 0.40 | 0.01 | 0.36 | 0.04 | 0.11 |
| | 35 | A clear colourless to yellow solution | 98.85 | 0.10 | 0.00 | 0.04 | 0.40 | 0.02 | 0.35 | 0.05 | 0.18 |

TABLE 5.2

Stability results for the analysis of drug product manufactured with alternative filter aids.

| | | | TM-170 Concentration (mg/ml) | | | | | | | | |
|---|---|---|---|---|---|---|---|---|---|---|---|
| Batch | Time (Day) | Visual Appearance | CBD | CBD-C1 | CBE II | OH-CBD | CBDV | CBE | CBD-C4 | THC | Total Degs |
| Spec. Limits | | A clear, colourless to yellow solution | 95.0-105.0 | N/A | NMT 0.20 | NMT 0.20 | N/A | NMT 0.20 | N/A | NMT 0.20 | NMT 0.50 |
| Celpure filter aid 1 | 0 | A clear colourless to yellow solution | 99.35 | 0.10 | 0.00 | 0.04 | 0.40 | 0.00 | 0.36 | 0.03 | 0.13 |
| | 7 | A clear colourless to yellow solution | 99.49 | 0.09 | 0.00 | 0.04 | 0.41 | 0.00 | 0.36 | 0.04 | 0.12 |
| | 35 | A clear colourless to yellow solution | 99.13 | 0.10 | 0.00 | 0.04 | 0.40 | 0.02 | 0.35 | 0.05 | 0.18 |
| Celpure filter aid 2 | 0 | A clear colourless to yellow solution | 99.15 | 0.07 | 0.00 | 0.04 | 0.39 | 0.01 | 0.36 | 0.03 | 0.14 |
| | 7 | A clear colourless to yellow solution | 99.59 | 0.08 | 0.00 | 0.04 | 0.39 | 0.00 | 0.36 | 0.03 | 0.16 |
| | 35 | A clear colourless to yellow solution | 99.19 | 0.08 | 0.00 | 0.03 | 0.39 | 0.01 | 0.36 | 0.04 | 0.20 |
| Celpure filter aid 3 | 0 | A clear colourless to yellow solution | 99.53 | 0.13 | 0.00 | 0.04 | 0.33 | 0.00 | 0.35 | 0.05 | 0.14 |
| | 7 | A clear colourless to yellow solution | 99.87 | 0.13 | 0.00 | 0.04 | 0.33 | 0.00 | 0.36 | 0.05 | 0.14 |
| | 35 | A clear colourless to yellow solution | 99.38 | 0.13 | 0.00 | 0.04 | 0.33 | 0.01 | 0.34 | 0.07 | 0.20 |
| Harborlite filter aid 1 | 0 | A clear colourless to yellow solution | 98.59 | 0.10 | 0.00 | 0.04 | 0.41 | 0.00 | 0.35 | 0.03 | 0.13 |
| | 7 | A clear colourless to yellow solution | 98.69 | 0.10 | 0.00 | 0.04 | 0.41 | 0.00 | 0.35 | 0.06 | 0.12 |
| | 35 | A clear colourless to yellow solution | 98.39 | 0.10 | 0.00 | 0.04 | 0.41 | 0.02 | 0.35 | 0.05 | 0.18 |
| Harborlite filter aid 2 | 0 | A clear colourless to yellow solution | 99.24 | 0.07 | 0.00 | 0.04 | 0.38 | 0.00 | 0.36 | 0.03 | 0.13 |
| | 7 | A clear colourless to yellow solution | 99.94 | 0.08 | 0.00 | 0.04 | 0.38 | 0.00 | 0.37 | 0.04 | 0.15 |
| | 35 | A clear colourless to yellow solution | 99.23 | 0.08 | 0.00 | 0.04 | 0.37 | 0.01 | 0.36 | 0.05 | 0.20 |

The results above show compliance with specification of CBD produced using both the telescoped process without filter aid and the telescoped process with alternative filter aids. There is no evidence to show any difference in the specification test result and therefore it can be concluded that the changes introduced in the manufacturing process had no negative impact on the quality of the final API. The study indicates that the no filter aid and alternative filter aid drug product meets the specification with regards to colour, impurity profile and also stability of this drug product at ambient conditions over a period of 35 days.

Example 3: Comparability Between Drug Product Resulting from Process A and Telescoped Process B with No Filter Aid The objective of this stability study was to investigate the stability of drug product from process B API produced without filter aid and to compare with drug product from process A API. Further, drug product from process B API produced with Clarcel filter aid was used to provide a comparison.

Testing was performed on bottles stored at the long-term condition of 25° C./60% RH (relative humidity) and the accelerated condition of 40° C./75% RH. A summary of the stability testing completed so far is shown in Table 6.

TABLE 6

Summary of stability testing

| Storage Condition | Orientation | Time-Points (Days) |
|---|---|---|
| 25° C./60% RH | Vertical | 0, 7, 14, 21, 28, 42, 56, 84, 112 |
| 40° C./75% RH | Vertical | 0, 7, 14, 21, 28, 42, 56, 84, 112 |

The following tests were performed on two no filter aid process B batches, a process A control batch and a Clarcel filter aid process B batch, for which results are shown in Tables 7.1 and 7.2:

Appearance

CBD Assay by UPLC

Degradants by UPLC

TABLE 7.1

Comparison between process B and process A drug product at 25° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| B | No filter aid | 0 | Colourless to yellow | 99.8 | 0.10 | <0.01 | 0.03 | 0.46 | 0.01 | 0.27 | 0.03 |
| | | 7 | Colourless to yellow | 99.3 | 0.10 | <0.01 | 0.03 | 0.46 | <0.01 | 0.27 | 0.04 |
| | | 14 | Colourless to yellow | 100.0 | 0.10 | 0.01 | 0.03 | 0.46 | <0.01 | 0.27 | 0.04 |
| | | 21 | Colourless to yellow | 99.6 | 0.10 | 0.01 | 0.03 | 0.46 | 0.01 | 0.26 | 0.04 |
| | | 28 | Colourless to yellow | 99.4 | 0.10 | <0.01 | 0.03 | 0.46 | <0.01 | 0.28 | 0.05 |
| | | 42 | Colourless to yellow | 99.2 | 0.09 | 0.00 | 0.03 | 0.46 | 0.01 | 0.28 | 0.05 |
| | | 56 | Colourless to yellow | 99.3 | 0.10 | 0.00 | 0.03 | 0.45 | 0.01 | 0.27 | 0.05 |
| | | 84 | Colourless to yellow | 99.4 | 0.11 | 0.01 | 0.03 | 0.46 | 0.02 | 0.27 | 0.06 |
| | | 112 | Yellow | 99.3 | 0.10 | 0.01 | 0.03 | 0.45 | 0.01 | 0.26 | 0.07 |
| B | No filter aid | 0 | Colourless to yellow | 99.5 | 0.10 | <0.01 | 0.04 | 0.37 | 0.01 | 0.36 | 0.04 |
| | | 7 | Colourless to yellow | 99.1 | 0.10 | <0.01 | 0.04 | 0.37 | <0.01 | 0.36 | 0.04 |
| | | 14 | Colourless to yellow | 99.8 | 0.10 | <0.01 | 0.04 | 0.37 | 0.01 | 0.36 | 0.05 |
| | | 21 | Colourless to yellow | 100.0 | 0.10 | <0.01 | 0.04 | 0.37 | <0.01 | 0.36 | 0.05 |
| | | 28 | Colourless to yellow | 99.6 | 0.10 | <0.01 | 0.04 | 0.37 | <0.01 | 0.37 | 0.05 |
| | | 42 | Colourless to yellow | 99.4 | 0.10 | 0.00 | 0.04 | 0.37 | 0.00 | 0.37 | 0.05 |
| | | 56 | Colourless to yellow | 99.7 | 0.11 | 0.00 | 0.04 | 0.37 | 0.00 | 0.36 | 0.05 |
| | | 84 | Colourless to yellow | 99.5 | 0.11 | 0.00 | 0.04 | 0.37 | 0.01 | 0.36 | 0.06 |
| | | 112 | Yellow | 99.50 | 0.11 | 0.00 | 0.04 | 0.36 | 0.01 | 0.36 | 0.06 |

TABLE 7.1

(Continued) Comparison between process B and process A drug product at 25° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| A | Process A control | 0 | Colourless to yellow | 99.5 | 0.07 | <0.01 | 0.02 | 0.37 | 0.01 | 0.30 | 0.03 |
| | | 7 | Colourless to yellow | 99.6 | 0.08 | <0.01 | 0.03 | 0.37 | <0.01 | 0.30 | 0.03 |
| | | 14 | Colourless to yellow | 99.5 | 0.07 | <0.01 | 0.02 | 0.37 | <0.01 | 0.30 | 0.03 |
| | | 21 | Colourless to yellow | 99.9 | 0.07 | <0.01 | 0.03 | 0.37 | <0.01 | 0.30 | 0.04 |
| | | 28 | Colourless to yellow | 99.4 | 0.08 | <0.01 | 0.03 | 0.36 | <0.01 | 0.31 | 0.04 |
| | | 42 | Colourless to yellow | 99.5 | 0.07 | 0.00 | 0.03 | 0.37 | 0.00 | 0.30 | 0.04 |
| | | 56 | Colourless to yellow | 99.6 | 0.08 | 0.00 | 0.03 | 0.37 | 0.00 | 0.30 | 0.04 |
| | | 84 | Colourless to yellow | 99.9 | 0.08 | 0.00 | 0.03 | 0.37 | 0.01 | 0.30 | 0.04 |
| | | 112 | Colourless to yellow | 99.64 | 0.08 | 0.00 | 0.02 | 0.37 | 0.00 | 0.30 | 0.04 |
| B | Clarcel | 0 | Colourless to yellow | 99.1 | 0.11 | 0.01 | 0.03 | 0.49 | 0.01 | 0.25 | 0.03 |
| | | 7 | Colourless to yellow | 99.0 | 0.10 | 0.01 | 0.03 | 0.49 | <0.01 | 0.25 | 0.04 |
| | | 14 | Colourless to yellow | 98.8 | 0.10 | 0.01 | 0.03 | 0.49 | 0.01 | 0.25 | 0.09 |
| | | 21 | Yellow | 99.1 | 0.10 | 0.02 | 0.03 | 0.49 | 0.02 | 0.25 | 0.11 |
| | | 28 | Yellow | 99.1 | 0.10 | 0.01 | 0.03 | 0.49 | 0.03 | 0.26 | 0.08 |
| | | 42 | Yellow | 98.8 | 0.09 | 0.02 | 0.03 | 0.49 | 0.03 | 0.26 | 0.10 |

TABLE 7.1-continued (Continued) Comparison between process B and process A drug product at 25° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| | | 56 | Yellow | 98.7 | 0.10 | 0.03 | 0.03 | 0.49 | 0.05 | 0.25 | 0.13 |
| | | 84 | Dark yellow | 97.9 | 0.11 | 0.06 | 0.03 | 0.48 | 0.11 | 0.25 | 0.21 |
| | | 112 | Dark yellow | 96.79 | 0.1 | 0.08 | 0.03 | 0.47 | 0.16 | 0.25 | 0.26 |

TABLE 7.2

Comparison between process B and process A drug product at 40° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| B | No filter aid | 0 | Colourless to yellow | 99.8 | 0.10 | <0.01 | 0.03 | 0.46 | 0.01 | 0.27 | 0.03 |
| | | 7 | Colourless to yellow | 99.3 | 0.10 | 0.01 | 0.03 | 0.46 | <0.01 | 0.26 | 0.04 |
| | | 14 | Colourless to yellow | 99.4 | 0.10 | 0.02 | 0.03 | 0.46 | 0.01 | 0.27 | 0.04 |
| | | 21 | Colourless to yellow | 99.5 | 0.10 | 0.02 | 0.03 | 0.46 | 0.02 | 0.27 | 0.05 |
| | | 28 | Colourless to yellow | 99.1 | 0.10 | 0.02 | 0.03 | 0.46 | 0.03 | 0.28 | 0.06 |
| | | 42 | Colourless to yellow | 99.3 | 0.10 | 0.03 | 0.03 | 0.46 | 0.04 | 0.27 | 0.06 |
| | | 56 | Colourless to yellow | 99.2 | 0.10 | 0.03 | 0.03 | 0.45 | 0.05 | 0.27 | 0.07 |
| | | 84 | Colourless to yellow | 99.0 | 0.11 | 0.03 | 0.03 | 0.45 | 0.08 | 0.26 | 0.08 |
| | | 112 | Yellow | 98.90 | 0.11 | 0.03 | 0.03 | 0.45 | 0.08 | 0.26 | 0.06 |
| B | No filter aid | 0 | Colourless to yellow | 99.5 | 0.10 | <0.01 | 0.04 | 0.37 | 0.01 | 0.36 | 0.04 |
| | | 7 | Colourless to yellow | 99.4 | 0.11 | <0.01 | 0.04 | 0.37 | <0.01 | 0.36 | 0.04 |
| | | 14 | Colourless to yellow | 99.4 | 0.10 | <0.01 | 0.04 | 0.37 | <0.01 | 0.36 | 0.05 |
| | | 21 | Colourless to yellow | 99.8 | 0.10 | 0.01 | 0.04 | 0.37 | 0.01 | 0.36 | 0.05 |
| | | 28 | Colourless to yellow | 99.3 | 0.10 | 0.01 | 0.04 | 0.37 | 0.01 | 0.36 | 0.06 |
| | | 42 | Colourless to yellow | 99.1 | 0.10 | 0.01 | 0.04 | 0.37 | 0.02 | 0.36 | 0.06 |
| | | 56 | Colourless to yellow | 99.3 | 0.11 | 0.02 | 0.04 | 0.37 | 0.02 | 0.36 | 0.07 |
| | | 84 | Yellow | 98.7 | 0.11 | 0.03 | 0.04 | 0.37 | 0.05 | 0.36 | 0.09 |
| | | 112 | Yellow | 98.71 | 0.11 | 0.04 | 0.04 | 0.36 | 0.07 | 0.35 | 0.11 |

TABLE 7.2

(Continued) Comparison between process B and process A drug product at 40° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| A | Process A control | 0 | Colourless to yellow | 99.5 | 0.07 | <0.01 | 0.02 | 0.37 | 0.01 | 0.30 | 0.03 |
| | | 7 | Colourless to yellow | 99.6 | 0.07 | <0.01 | 0.03 | 0.37 | <0.01 | 0.30 | 0.03 |
| | | 14 | Colourless to yellow | 99.7 | 0.08 | <0.01 | 0.03 | 0.37 | <0.01 | 0.30 | 0.03 |
| | | 21 | Colourless to yellow | 99.7 | 0.07 | <0.01 | 0.02 | 0.37 | <0.01 | 0.30 | 0.04 |
| | | 28 | Colourless to yellow | 99.8 | 0.08 | 0.01 | 0.03 | 0.37 | 0.01 | 0.31 | 0.04 |
| | | 42 | Colourless to yellow | 99.2 | 0.07 | 0.01 | 0.03 | 0.37 | 0.01 | 0.30 | 0.04 |
| | | 56 | Colourless to yellow | 99.8 | 0.08 | 0.01 | 0.02 | 0.37 | 0.02 | 0.30 | 0.05 |
| | | 84 | Colourless to yellow | 99.3 | 0.08 | 0.01 | 0.03 | 0.37 | 0.03 | 0.30 | 0.06 |
| | | 112 | Colourless to yellow | 99.17 | 0.08 | 0.01 | 0.02 | 0.36 | 0.04 | 0.30 | 0.06 |
| B | Clarcel | 0 | Colourless to yellow | 99.1 | 0.11 | 0.01 | 0.03 | 0.49 | 0.01 | 0.25 | 0.03 |
| | | 7 | Colourless to yellow | 99.3 | 0.10 | 0.02 | 0.03 | 0.50 | 0.03 | 0.26 | 0.07 |
| | | 14 | Colourless to yellow | 98.7 | 0.10 | 0.02 | 0.03 | 0.49 | 0.06 | 0.25 | 0.09 |
| | | 21 | Yellow | 99.7 | 0.10 | 0.03 | 0.03 | 0.49 | 0.07 | 0.25 | 0.08 |
| | | 28 | Dark yellow | 97.8 | 0.10 | 0.07 | 0.03 | 0.49 | 0.14 | 0.26 | 0.21 |
| | | 42 | Dark yellow | 97.1 | 0.10 | 0.11 | 0.03 | 0.48 | 0.24 | 0.26 | 0.21 |
| | | 56 | Dark yellow | 96.3 | 0.10 | 0.14 | 0.03 | 0.48 | 0.31 | 0.26 | 0.21 |
| | | 84 | Dark yellow | 96.0 | 0.11 | 0.18 | 0.03 | 0.48 | 0.42 | 0.26 | 0.24 |
| | | 112 | Dark yellow | 95.25 | 0.10 | 0.23 | 0.03 | 0.47 | 0.51 | 0.26 | 0.22 |

The results from the stability study confirmed previous results shown in Table 5, whereby drug product from process B API produced without filter aid were within specification limits. Significantly, the no filter aid process B drug product was comparable to drug product from process A API. On the other hand, drug product from process B API produced with Clarcel filter aid were significantly different to process A drug product and no filter aid process B drug product in terms of appearance and degradant levels. In particular, THC concentration fell outside of the specification limit at 84 and 112 days at 25° C. (Table 7.1), and from 28 days onwards at 40° C. (Table 7.2), whilst appearance of the solutions turned dark yellow at the aforementioned timepoints.

Conclusion

The results up to 112 days (16 weeks) show that the no filter aid process B batches were comparable to process A batches with regard to appearance, CBD and degradant concentration at both 25° C. and 40° C. Thus, these results demonstrate that the no filter aid process B drug products retain the same quality, purity and stability as the process A drug product over a long period of time.

Example 4: Stability of Drug Product Resulting from Telescoped Process B with No Filter Aid The objective of this stability study was to investigate the long term (6 month) stability of drug product from process B API produced without filter aid. Testing was performed on bottles stored at the long-term condition of 25° C./60% RH and the accelerated condition of 40° C./75% RH.

A summary of the stability testing completed so far is shown in Table 8.

TABLE 8

Summary of stability testing

| Storage Condition | Orientation | Time-Points (Days) |
|---|---|---|
| 25° C./60% RH | Vertical | 0, 7, 14, 21, 28, 42, 56, 84, 168 |
| 40° C./75% RH | Vertical | 0, 7, 14, 21, 28, 42, 56, 84, 168 |

The following tests were performed on three no filter aid process B batches, for which results are shown in Tables 9.1 and 9.2 as well as FIGS. 11 to 15:

Appearance

Colourimetry

CBD Assay by UPLC

Degradants by UPLC

TABLE 9.1

Long-term stability results of process B no filter aid drug product at 25° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| B | No filter aid | 0 | Colourless to yellow | 99.54 | 0.11 | 0.00 | 0.03 | 0.34 | 0.00 | 0.32 | 0.04 |
| | | 7 | Colourless to yellow | 99.64 | 0.11 | 0.00 | 0.03 | 0.34 | 0.00 | 0.32 | 0.05 |
| | | 14 | Colourless to yellow | 100.51 | 0.11 | 0.00 | 0.04 | 0.34 | 0.00 | 0.33 | 0.05 |
| | | 21 | Colourless to yellow | 99.45 | 0.11 | 0.00 | 0.03 | 0.34 | 0.00 | 0.32 | 0.05 |
| | | 28 | Colourless to yellow | 99.17 | 0.11 | 0.00 | 0.03 | 0.34 | 0.00 | 0.32 | 0.04 |
| | | 56 | Colourless to yellow | 99.62 | 0.11 | 0.00 | 0.04 | 0.34 | 0.01 | 0.32 | 0.05 |
| | | 84 | Colourless to yellow | 99.42 | 0.12 | 0.00 | 0.04 | 0.34 | 0.01 | 0.31 | 0.06 |
| | | 128 | Colourless to yellow | 99.55 | 0.11 | 0.00 | 0.04 | 0.34 | 0.01 | 0.31 | 0.05 |
| B | No filter aid | 0 | Colourless to yellow | 99.72 | 0.12 | 0.00 | 0.04 | 0.37 | 0.00 | 0.32 | 0.05 |
| | | 7 | Colourless to yellow | 99.30 | 0.12 | 0.00 | 0.04 | 0.37 | 0.00 | 0.33 | 0.04 |
| | | 14 | Colourless to yellow | 99.80 | 0.12 | 0.00 | 0.04 | 0.37 | 0.00 | 0.33 | 0.05 |
| | | 21 | Colourless to yellow | 99.40 | 0.12 | 0.00 | 0.04 | 0.37 | 0.00 | 0.33 | 0.05 |
| | | 28 | Colourless to yellow | 99.41 | 0.12 | 0.00 | 0.04 | 0.37 | 0.00 | 0.33 | 0.04 |
| | | 56 | Colourless to yellow | 99.49 | 0.12 | 0.00 | 0.04 | 0.37 | 0.01 | 0.32 | 0.05 |
| | | 84 | Colourless to yellow | 99.55 | 0.12 | 0.00 | 0.04 | 0.37 | 0.01 | 0.32 | 0.05 |
| | | 128 | Colourless to yellow | 99.43 | 0.12 | 0.00 | 0.04 | 0.36 | 0.01 | 0.31 | 0.05 |
| B | No filter aid | 0 | Colourless to yellow | 99.93 | 0.09 | 0.00 | 0.02 | 0.43 | 0.00 | 0.28 | 0.04 |
| | | 7 | Colourless to yellow | 99.57 | 0.09 | 0.00 | 0.02 | 0.43 | 0.00 | 0.28 | 0.04 |
| | | 14 | Colourless to yellow | 99.87 | 0.09 | 0.00 | 0.01 | 0.43 | 0.01 | 0.28 | 0.04 |
| | | 21 | Colourless to yellow | 99.39 | 0.09 | 0.00 | 0.01 | 0.43 | 0.00 | 0.28 | 0.04 |
| | | 28 | Colourless to yellow | 99.26 | 0.09 | 0.00 | 0.02 | 0.43 | 0.00 | 0.27 | 0.04 |
| | | 56 | Colourless to yellow | 99.73 | 0.09 | 0.00 | 0.01 | 0.43 | 0.01 | 0.28 | 0.04 |
| | | 84 | Colourless to yellow | 99.57 | 0.09 | 0.00 | 0.02 | 0.43 | 0.01 | 0.27 | 0.05 |
| | | 128 | Colourless to yellow | 99.78 | 0.09 | 0.00 | 0.02 | 0.43 | 0.02 | 0.27 | 0.04 |

TABLE 9.2

Long-term stability results of process B no filter aid drug product at 40° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| B | No filter aid | 0 | Colourless to yellow | 99.54 | 0.11 | 0.00 | 0.03 | 0.34 | 0.00 | 0.32 | 0.04 |
| | | 7 | Colourless to yellow | 100.00 | 0.11 | 0.00 | 0.03 | 0.34 | 0.00 | 0.32 | 0.05 |
| | | 14 | Colourless to yellow | 99.68 | 0.11 | 0.00 | 0.03 | 0.34 | 0.01 | 0.32 | 0.05 |
| | | 21 | Colourless to yellow | 99.46 | 0.11 | 0.00 | 0.03 | 0.34 | 0.01 | 0.32 | 0.06 |
| | | 28 | Colourless to yellow | 99.57 | 0.12 | 0.01 | 0.04 | 0.34 | 0.01 | 0.32 | 0.05 |
| | | 56 | Colourless to yellow | 99.31 | 0.11 | 0.00 | 0.03 | 0.34 | 0.02 | 0.32 | 0.05 |
| | | 84 | Colourless to yellow | 99.44 | 0.11 | 0.01 | 0.03 | 0.34 | 0.03 | 0.32 | 0.07 |
| | | 128 | Colourless to yellow | 99.07 | 0.11 | 0.02 | 0.05 | 0.34 | 0.08 | 0.31 | 0.07 |
| B | No filter aid | 0 | Colourless to yellow | 99.72 | 0.12 | 0.00 | 0.04 | 0.37 | 0.00 | 0.32 | 0.05 |
| | | 7 | Colourless to yellow | 99.42 | 0.12 | 0.00 | 0.04 | 0.37 | 0.01 | 0.33 | 0.05 |
| | | 14 | Colourless to yellow | 100.13 | 0.12 | 0.00 | 0.04 | 0.37 | 0.00 | 0.33 | 0.05 |
| | | 21 | Colourless to yellow | 99.25 | 0.12 | 0.00 | 0.04 | 0.37 | 0.01 | 0.32 | 0.06 |

TABLE 9.2-continued

Long-term stability results of process B no filter aid drug product at 40° C.

| API Process | API Information | Time (Day) | Appearance of Solution | TM-170 Concentration (% of Label Claim) | | | | | | | |
|---|---|---|---|---|---|---|---|---|---|---|---|
| | | | | CBD | CBD-C1 | CBE II | OH-CBD | CBDV | CBE I | CBD-C4 | THC |
| | | 28 | Colourless to yellow | 99.46 | 0.12 | 0.00 | 0.04 | 0.37 | 0.01 | 0.32 | 0.05 |
| | | 56 | Colourless to yellow | 99.25 | 0.12 | 0.00 | 0.04 | 0.37 | 0.02 | 0.32 | 0.05 |
| | | 84 | Colourless to yellow | 99.58 | 0.12 | 0.00 | 0.04 | 0.37 | 0.03 | 0.32 | 0.07 |
| | | 128 | Colourless to yellow | 99.30 | 0.12 | 0.01 | 0.05 | 0.36 | 0.06 | 0.31 | 0.07 |
| B | No filter aid | 0 | Colourless to yellow | 99.93 | 0.09 | 0.00 | 0.02 | 0.43 | 0.00 | 0.28 | 0.04 |
| | | 7 | Colourless to yellow | 99.92 | 0.09 | 0.00 | 0.02 | 0.43 | 0.00 | 0.28 | 0.04 |
| | | 14 | Colourless to yellow | 100.08 | 0.09 | 0.00 | 0.02 | 0.43 | 0.01 | 0.28 | 0.05 |
| | | 21 | Colourless to yellow | 99.48 | 0.09 | 0.00 | 0.02 | 0.43 | 0.01 | 0.28 | 0.05 |
| | | 28 | Colourless to yellow | 99.77 | 0.10 | 0.00 | 0.02 | 0.43 | 0.01 | 0.28 | 0.04 |
| | | 56 | Colourless to yellow | 99.70 | 0.10 | 0.00 | 0.02 | 0.43 | 0.02 | 0.28 | 0.05 |
| | | 84 | Colourless to yellow | 99.48 | 0.09 | 0.01 | 0.02 | 0.42 | 0.04 | 0.27 | 0.06 |
| | | 128 | Colourless to yellow | 99.40 | 0.09 | 0.01 | 0.01 | 0.42 | 0.08 | 0.27 | 0.07 |

Figure 11:
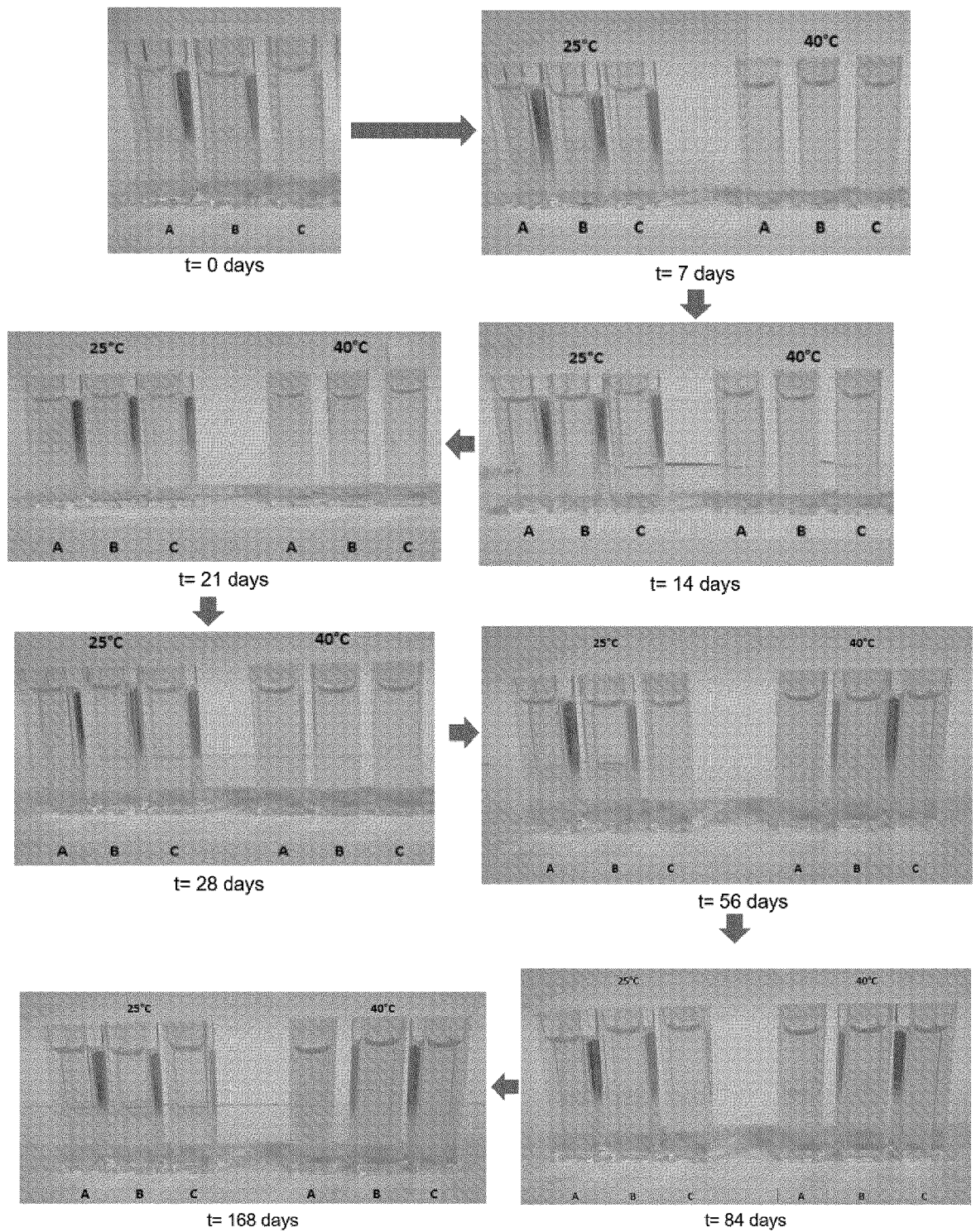
FIG. 11 shows appearance of batches at 25° C. and 40° C. at initial timepoint, and after 7, 14, 21, 28, 56, 84 and 168 days.

At the storage condition of 25° C., all results complied with the specification acceptance criteria of a clear, colourless to yellow solution after 168 days (see FIG. 11). There were no significant changes in appearance over the testing period.

At the accelerated condition of 40° C., all results complied with the specification acceptance criteria of a clear, colourless to yellow solution after 24 weeks. There were no significant changes in appearance over the testing period. The batches were slightly darker yellow compared to the 25° C. condition at each time-point. This was an expected observation as the same is seen for drug product manufactured using Process A.

Figure 12:
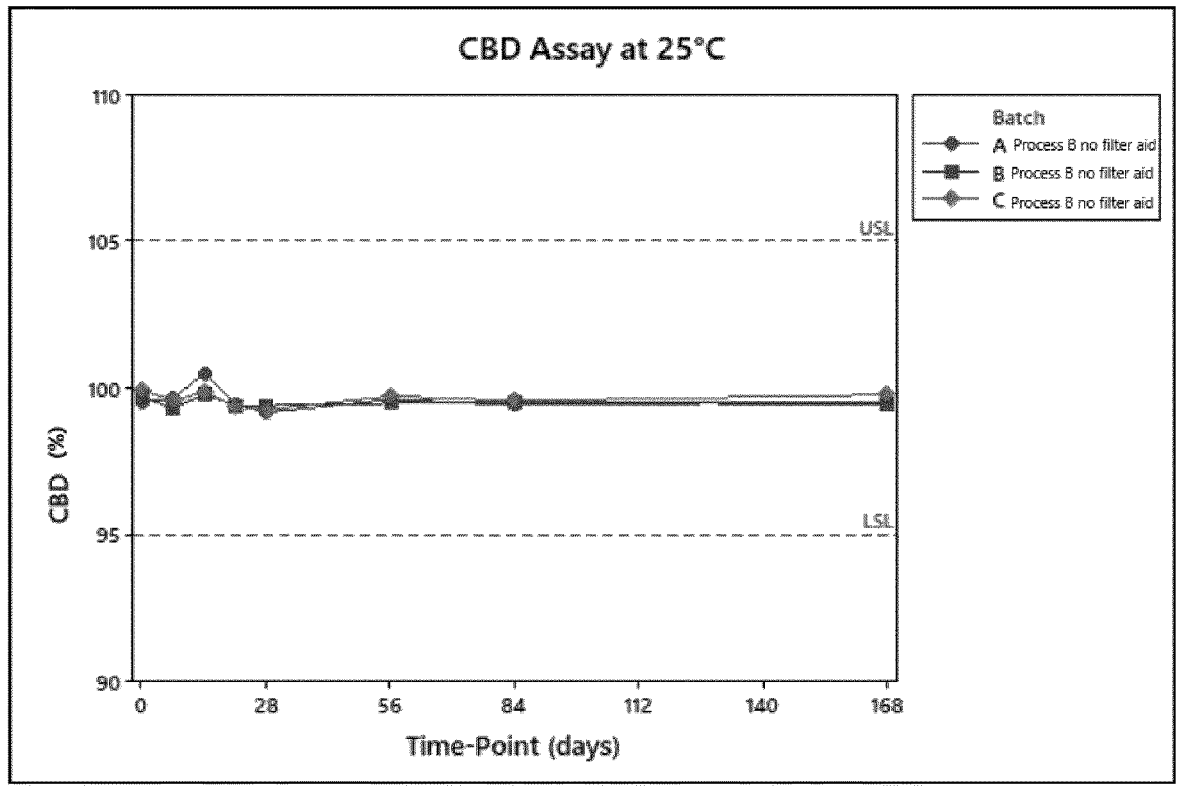
FIG. 12 shows CBD assay results of all three Process B no filter aid batches at 25° C. and at 40° C. from Example 4.
Figure 12:
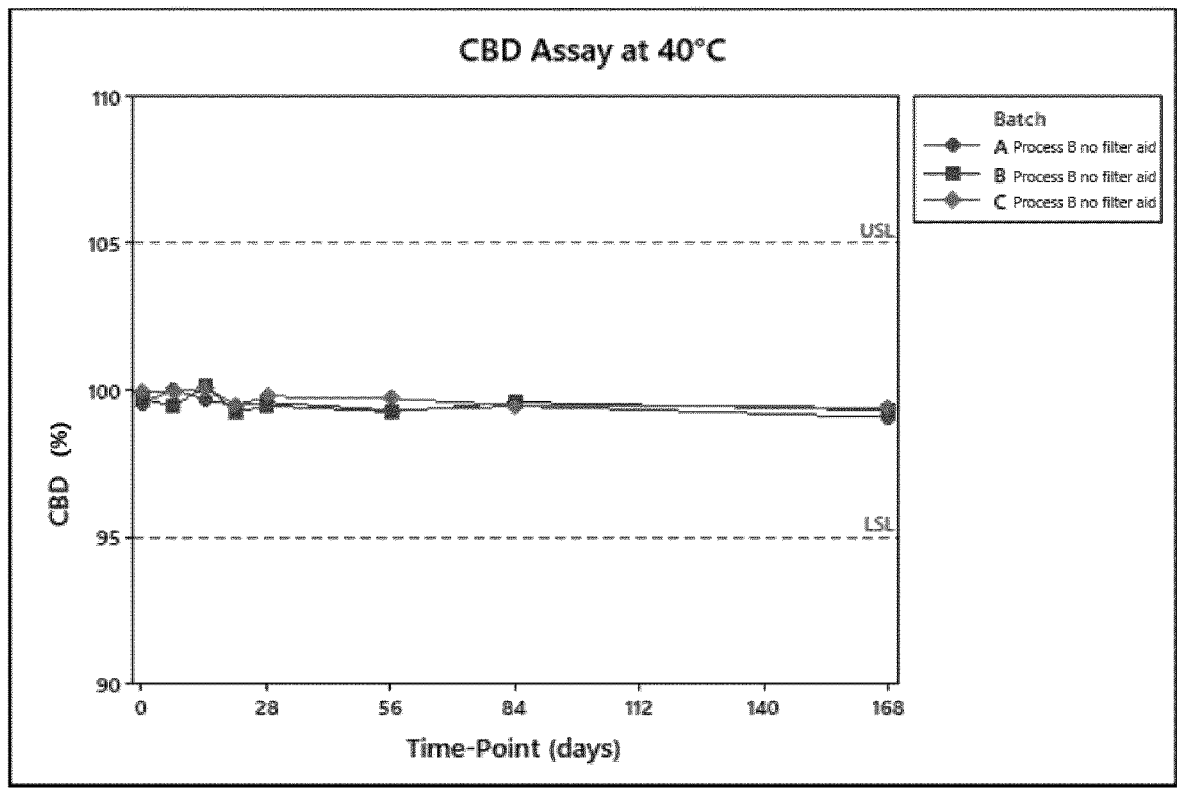
Figure 13:
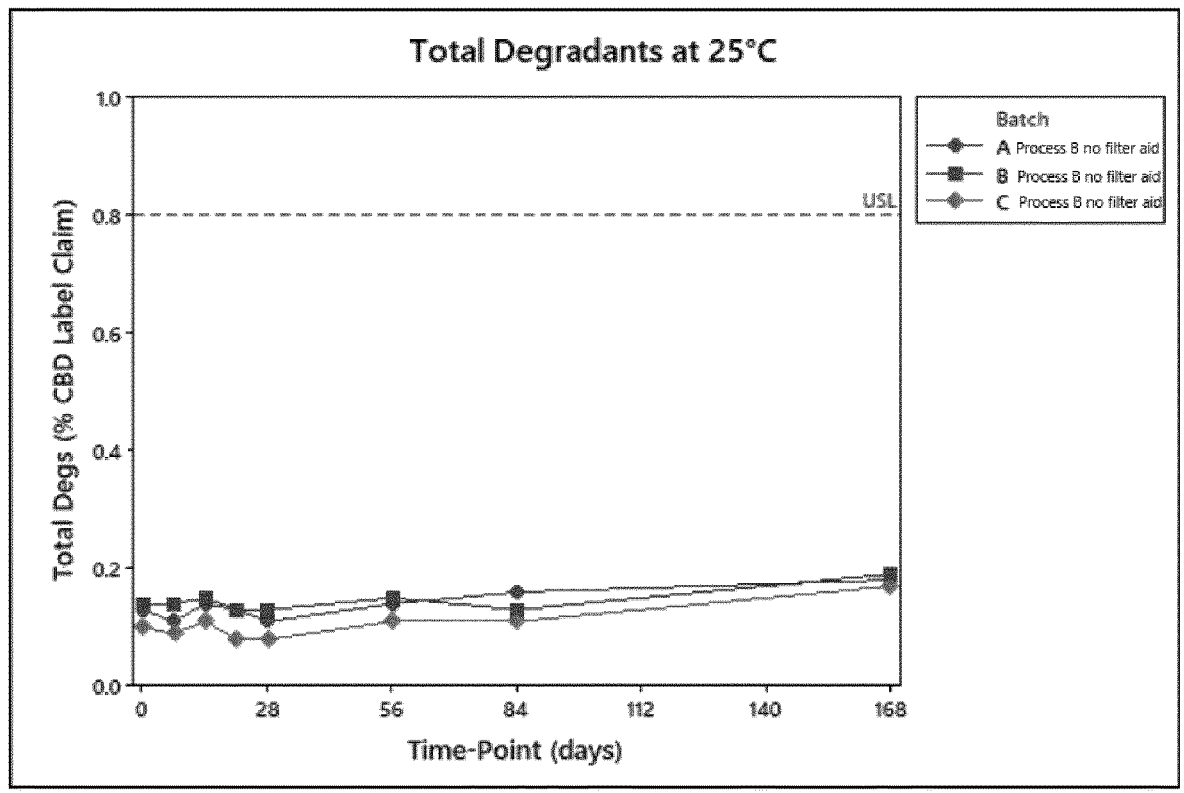
FIG. 13 shows total degradants results of all three Process B no filter aid batches at 25° C. and at 40° C. from Example 4.
Figure 13:
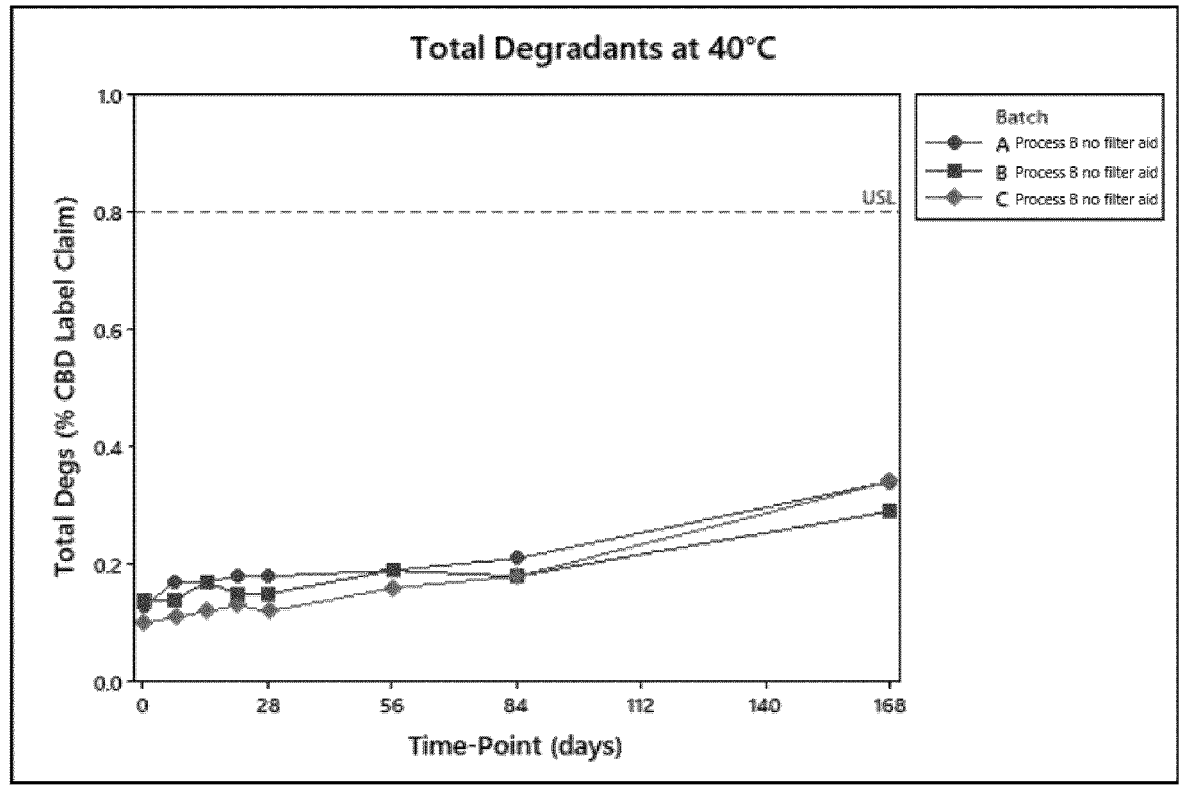
Figure 14:
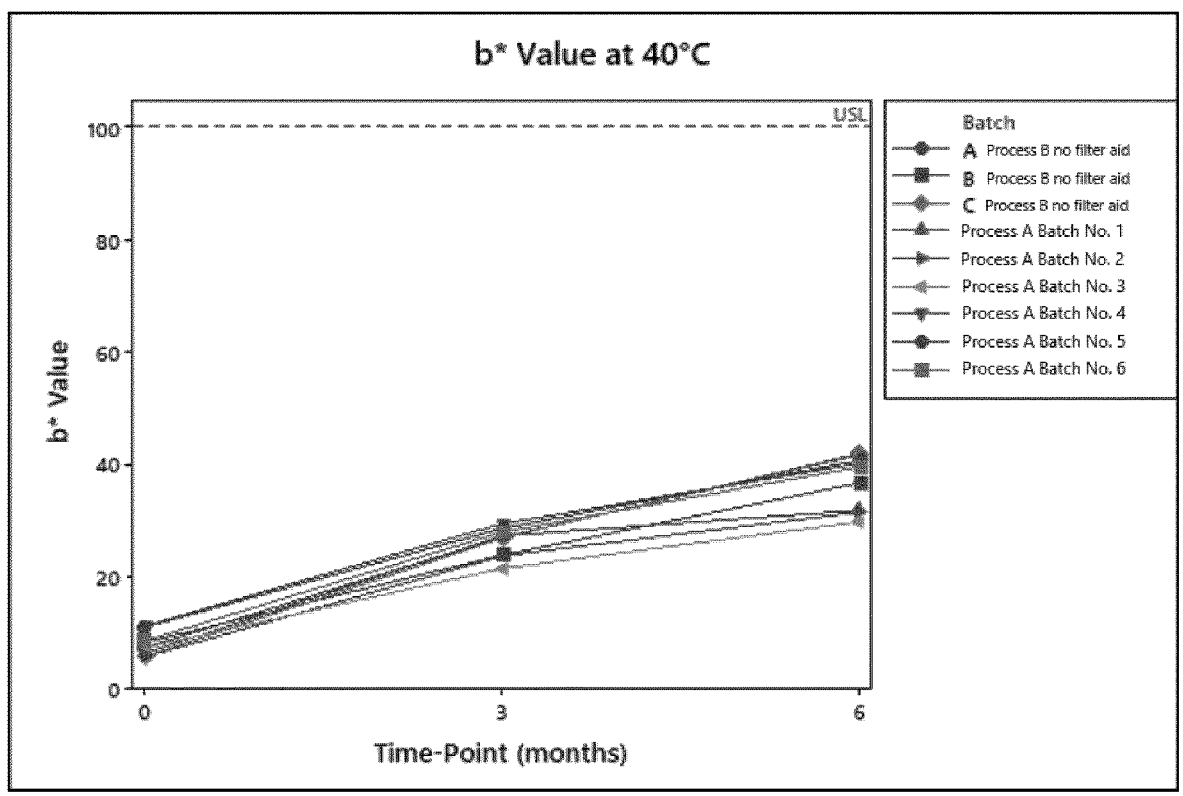
FIG. 14 shows b* values from a colourimetry test at 40° C. comparing trends of three Process B no filter aid batches versus Process A batches. The b* values are blueness or yellowness based on the Opponent-Colour theory.
Figure 15:
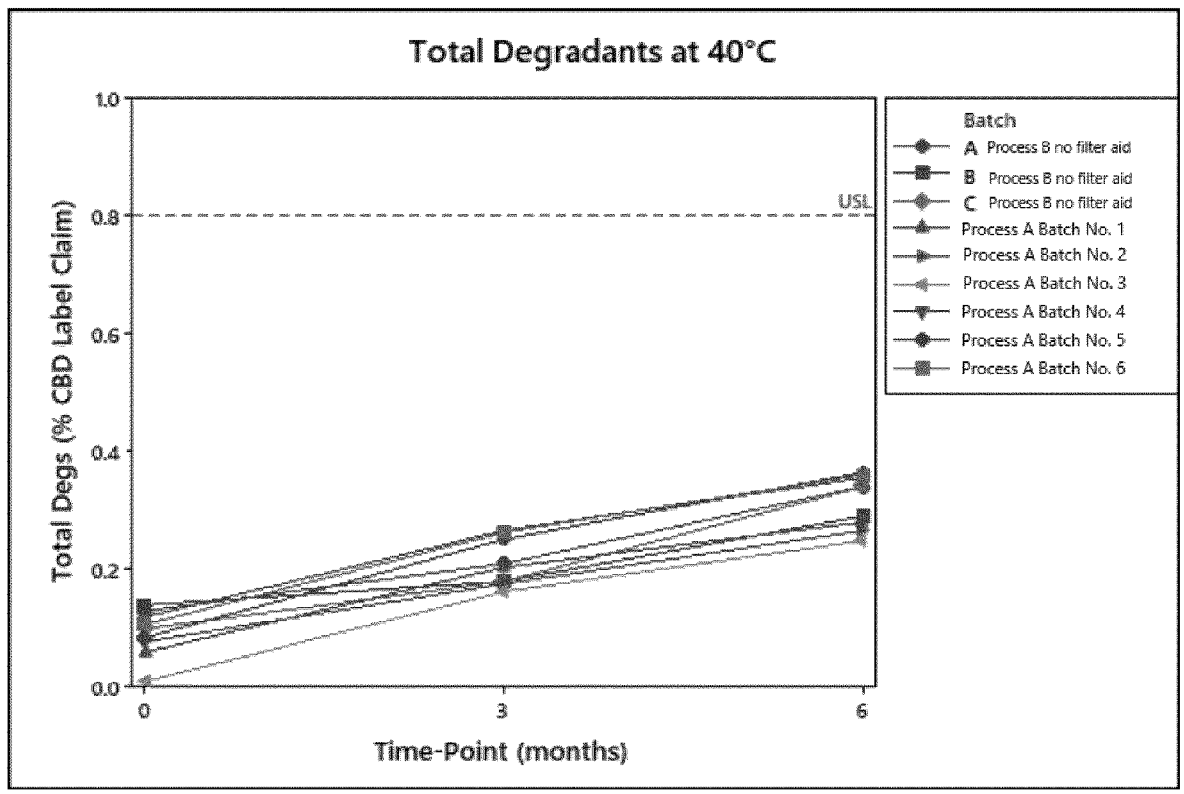
FIG. 15 shows total degradant results at 40° C. comparing trends of three Process B no filter aid batches versus Process A batches.

As can be seen by FIGS. 12 and 13 and Tables 9.1 and 9.2, neither CBD content nor other cannabinoids varied significantly over the 6 m term. Furthermore, a comparison of Process B no filter aid batches with Process A batches at accelerated conditions of 40° C. showed little to no deviation in b* values (see FIG. 14) nor in total degradants (see FIG. 15).

Conclusion

All results were within their respective specification limits after 24 weeks and there were no significant changes over the testing period. All results and trends were comparable to stability results for drug product manufactured using Process A.

Example 5: Addition of Chelating Agent

In order to further optimise no filter aid process B, it was investigated whether the addition of a chelating agent within the wash regime may further reduce the trace element contamination, whilst maintaining the appearance of no filter aid process B drug product.

Figure 16:
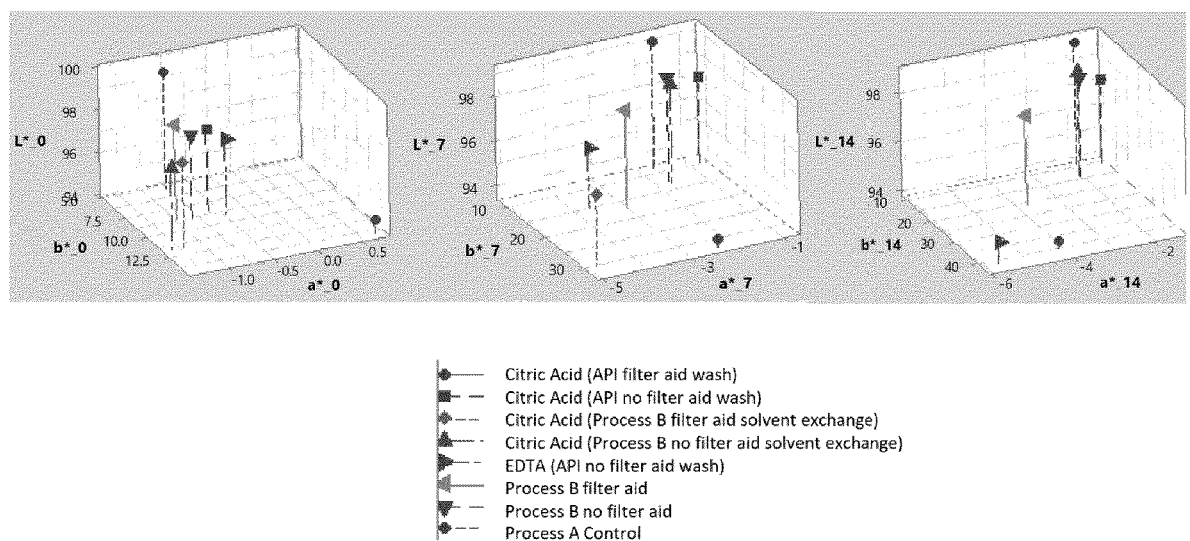
FIG. 16 shows 3-D scatterplots of colourimetry results for the drug products produced under different conditions used to test different chelating agents, citric acid and EDTA.
Figure 17:
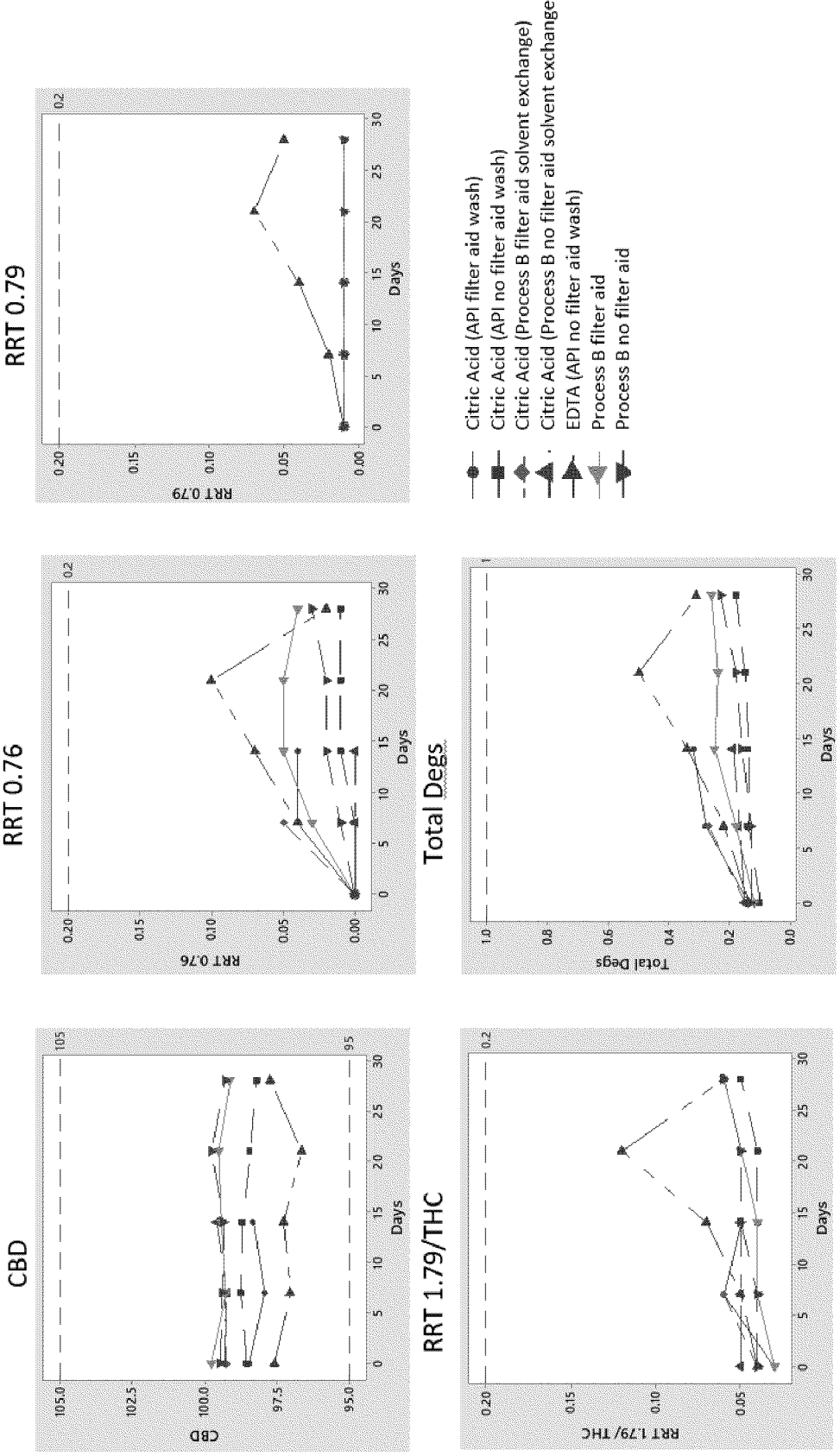
FIG. 17 shows the impurity profiles as well as CBD percentage present in the drug product produced under the same conditions as FIG. 16.

Citric acid was compared to EDTA as a candidate for the chelating agent. Over the course of 14 days, the colourimetry data of the API and drug products manufactured under the following conditions were recorded, for which results are shown in FIG. 16:

Citric Acid (API filter aid wash)
Citric Acid (API no filter aid wash)
Citric Acid (Process B filter aid; solvent exchange)
Citric Acid (Process B no filter aid; solvent exchange)
EDTA (API no filter aid wash)
Process B filter aid
Process B no filter aid
Process A Control The concentration of various impurities and CBD were also measured (excluding the process A control). These results are shown in FIG. 17.

It was surprisingly found that the addition of a citric acid wash during the solvent exchange process in process B (without filter aid) would be beneficial to reducing degradant concentration. This is evidenced by the impurity profiles as shown in FIG. 17, in particular the profile for RRT 0.76 (purple line). The colourimetry data also confirmed that the addition of a citric acid wash would not change the appearance of drug product, as shown by the similar colourimetry profiles for 'Process A Control' and 'Citric Acid (Process B no filter aid solvent exchange).'

Conclusion

Overall, it was concluded that the addition of citric acid as a chelating agent in the solvent exchange would be useful to further reduce the impurities and degradants from the drug product.

Example 6: Addition of Antioxidants

Further optimisation was carried out to test whether the addition of antioxidants would reduce degradants present in the drug product. Antioxidants tested are identified in table 10. Samples were stored at 60° C. and assessed by chromatography.

In this instance, CBD-C4 was used, however, it is appreciated that all cannabinoids can be used.

TABLE 10

Summary of antioxidant testing

| Antioxidant | Time-Points (Days) |
|---|---|
| Alpha Tocopherol | 7, 27, 54 |
| EDTA | 7, 27, 54 |
| BHA | 7, 27, 54 |
| Citric Acid | 7, 27, 54 |
| Ascorbyl Palmitate | 7, 27, 54 |
| Mono thiolglycerol | 7, 27, 54 |

Figure 18:
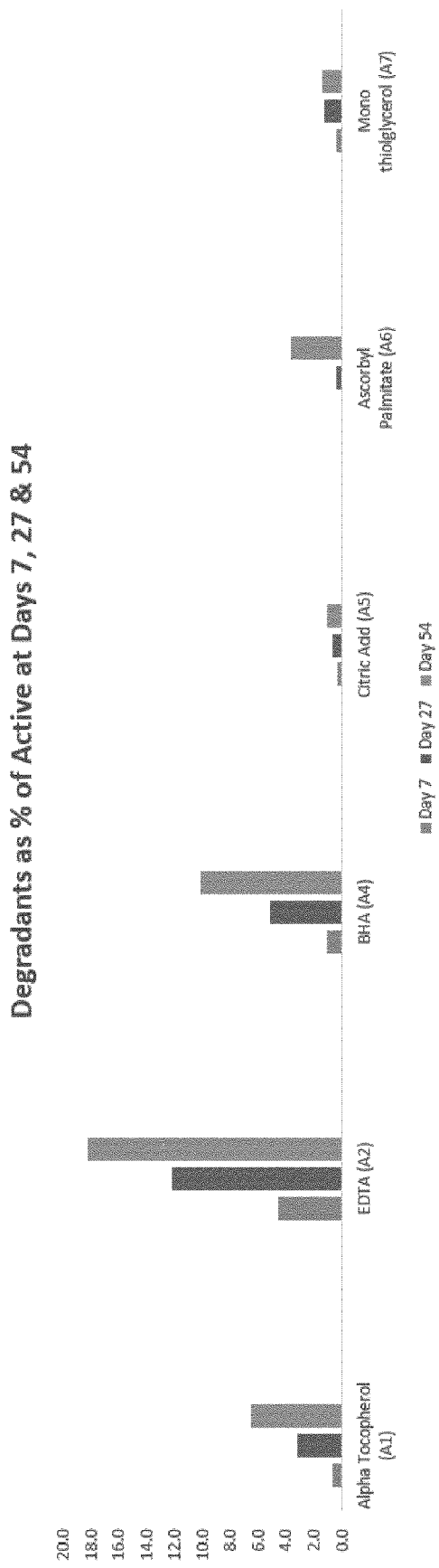
FIG. 18 shows percentage of degradants present at three different timepoints when using five different antioxidants.

Results from antioxidant testing is shown in FIG. 18. At 27 days, the most effective antioxidant was ascorbyl palmitate with 0.39% degradants as % of active and at 54 days, the citric acid was the most effective antioxidant with 1.05% degradants as % of active.

Conclusion

The results up to 54 days indicate that the addition of citric acid and/or ascorbyl palmitate as an antioxidant may be beneficial to maintain a low degradant percentage in the drug product.

Example 7: Further Stability Study with Antioxidant

A range of CBD gels were prepared and both colour and degradation (by HPLC) were investigated under forced degradation conditions.

Methods

33% CBD Gels were formulated using different antioxidants and placed in forced degradation conditions (60° C.). The different antioxidants used were as follows; Alpha Tocopherol, EDTA, Sodium Metabisulphite, BHA, Citric Acid, Ascorbyl Palmitate and Mono Thioglycerol. The colour of the gels was observed for the entire forced degradation period as well as an analytical profiling to identify any impurity RRT's corresponding with colour change.

10 g of 33% CBD gel was manufactured using a variety of antioxidants (see Table 11). From the bulk, 0.5 g aliquots were placed into 20 ml scintillation vials and placed in a (60° C.) oven. At various timepoints, samples were removed and tested physically and chemically. All chemical analysis was performed by HPLC analysis of the CBD Gel Formulation in Hard Gelatine Capsules.

TABLE 11

CBD Gel Components

| | |
|---|---|
| CBD | 33% |
| Kolliphor P124 | 3% |
| Kolliphor P188 | 38.17% |
| Tri-ethyl citrate | 25% |
| Antioxidant* | 0.5% |

Figure 19:
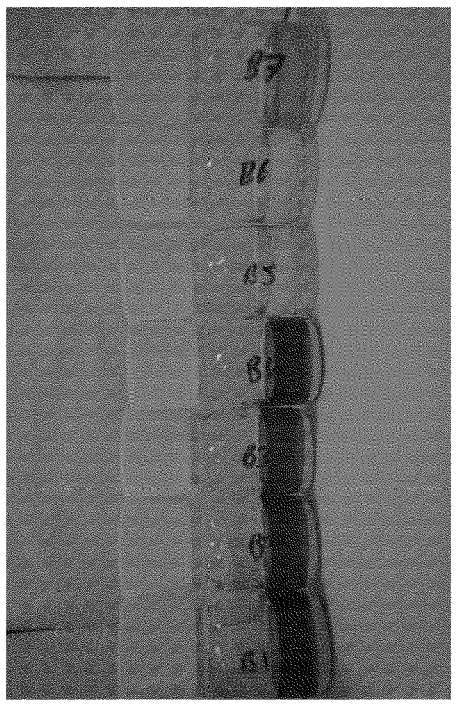
FIG. 19 shows photographs of CBD gels at initial timepoint and at Day 27 using different antioxidants.
Figure 19:
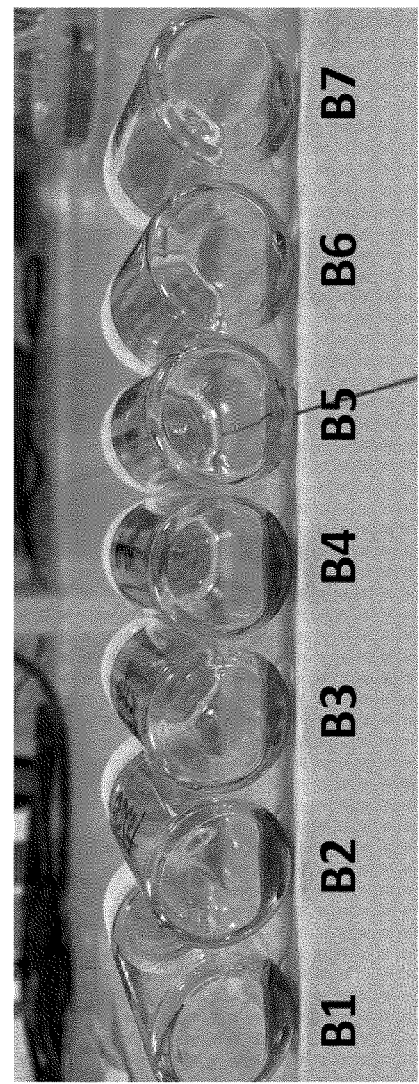

*Antioxidants used were Alpha Tocopherol, EDTA, Sodium Metabisulphite, BHA, Citric Acid, Ascorbyl Palmitate and Mono Thioglycerol Results Physical Analysis The data presented in FIG. 19 shows the colour changes of the CBD gels depending on which antioxidant is present in the formulation. The data shows that gels formulated with antioxidants Alpha Tocopherol, EDTA, Sodium Metabisulphite and BHA (batches B1 to B4) became a dark brown/purple colour. Formulations present with Ascorbyl Palmitate and Citric Acid (batches B5 and B6) remained yellow after 28 days.

Chemical Analysis

The data presented in Table 12 below shows that at the initial timepoint there are no degradants present in the formulations. The only peaks present are CBDV, CBD-C4 and CBD.

TABLE 12

Initial timepoint results

| Antioxidant | Batch number | CBDV | CBD-C4 | CBD |
|---|---|---|---|---|
| Alpha Tocopherol | B1 | 0.791 | 0.794 | 232.059 |
| EDTA | B2 | 0.788 | 0.755 | 232.999 |
| Sodium Metabisulphite | B3 | 0.802 | 0.845 | 240.580 |
| BHA | B4 | 0.969 | 0.973 | 286.431 |
| Citric Acid | B5 | 1.094 | 1.102 | 322.773 |
| Ascorbyl Palmitate | B6 | 1.140 | 1.121 | 326.989 |
| Monothio glycerol | B7 | 1.144 | 1.146 | 327.865 |

The data presented in Table 13 shows that at the day 27 timepoint the degradants RRT 0.544, RRT 0.561, RRT 0.599, RRT 0.877 RRT 1.236 & RRT 1.281 are present in formulations containing Alpha Tocopherol, EDTA, Sodium Metabisulphite, BHA and Monothioglycerol. In the Citric Acid and Ascorbyl Palmitate formulations, these degradants were not found to be present. Both formulations (shown in FIG. 19) keep their original yellow colour and do not degrade into dark brown/purple.

TABLE 13

Day 28 of forced degradation results

| Antioxidant | Batch number | RRT 0.544 | RRT 0.561 | RRT 0.599 | RRT 0.877 | RRT 1.236 | RRT 1.281 |
|---|---|---|---|---|---|---|---|
| Alpha Tocopherol | B1 | 0.635 | 0.662 | 0.164 | 0.896 | <LOQ | <LOQ |
| EDTA | B2 | 3.017 | 2.805 | 0.4155 | 5.678 | <LOQ | <LOQ |
| Sodium Metabisulphite | B3 | <LOQ | <LOQ | 0.196 | <LOQ | 1.29 | 0.434 |
| BHA | B4 | 1.861 | 1.038 | 0.252 | 3.052 | <LOQ | <LOQ |
| Citric Acid | B5 | N/D | N/D | N/D | N/D | N/D | N/D |
| Ascorbyl Palmitate | B6 | N/D | N/D | N/D | N/D | N/D | N/D |
| Monothio glycerol | B7 | 0.297 | 0.352 | N/D | 0.497 | N/D | <LOQ |

Conclusion

Several antioxidants were studied (as part of a CBD gel formulation), under accelerated conditions, and were tested visually for colour and degradation by HPLC. Several antioxidants did not inhibit a significant colour and nor a concomitant rise in several impurities.

Ascorbyl Palmitate and Citric Acid showed a significant difference with an obvious minimisation in the intensity of colour produced in the formulation and significantly, a detectable absence of many key impurities.

Outline of the Telescoped Process B (Post-Extraction Step)
1. Non-refined CBD extract is dissolved in 2.0 volumes of methanol at 50° C.

2. The mixture is stirred at 0° C. to 5° C. for 60 minutes to precipitate waxy impurities.
3. Waxy impurities are filtered under vacuum and the resulting cake washed with 3×0.5 volumes of cold methanol to remove traces of retained CBD.
4. The methanol solution is distilled to a solution volume of 1.5 volumes.
5. Heptane is added to the concentrated solution, according to the required ingoing experimental concentration for crystallisation (2.2 volumes).
6. The solution is washed with 3×2.0 volumes of purified water, separating the aqueous phases containing methanol. An IPC confirms that residual methanol content is within specification.
7. The washed heptane solution is heated to 50° C. and filtered hot (polished) to remove undissolved particles, washing through with 0.3 volumes of heptane (Total 2.0 volumes of heptane).
8. The solution is cooled to 25° C., then slowly cooled to 12° C. (over 6 hours).
9. An agitation speed of 115 rpm is maintained during crystallisation in the small plant (or that equivalent if in a different vessel).
10. The solution is seeded with 1.0% w/w crystalline CBD and the seed allowed to propagate over 180 minutes (3 hours).
11. The suspension is cooled to −18° C. to −20° C. over 960 minutes (16 hours), then stirred at −20° C. for 360 minutes (6 hours).
12. The suspension is filtered under vacuum, then washed with three heptane washes (totaling 3.0 volumes).
    2×0.75 volume displacement washes at −18° C. and 10° C.
    1×1.5 volume, 30 minute re-slurry at 10° C.
13. The product is de-liquored, then dried under vacuum at 20° C. to 30° C. until it meets the specification for residual heptane.

The above volumes and concentrations are to be relied on as representative values only. Different scales would require adjustment accordingly.

Overall Conclusion

API manufactured either without the use of a filter aid or using alternative filter aids in telescoped process B show compliance with respect to specification criteria. Drug product manufactured from no filter aid and alternative filter aid telescoped processes also meet the specification with regards to colour, impurity profile and stability. Significantly, this drug product was found to be comparable to drug product manufactured from control process A over a range of temperatures and over a long time period.

The addition of a chelating agent such as citric acid, and antioxidants such as citric acid and ascorbyl palmitate, can further improve drug product impurity profiles.

Thus, it can be concluded that the above-outlined process, being more efficient and streamlined than prior described methods, is able to manufacture cannabinoids for use in pharmaceuticals that is both stable and substantially pure.

The invention claimed is:

1. A process of preparing a stable substantially pure cannabinoid comprising:
    a) decarboxylating botanical material to produce decarboxylated botanical material;
    b) extracting the decarboxylated botanical material to produce crude extract; and
    c) winterizing and crystallizing the crude extract of step b) to produce a stable substantially pure cannabinoid, comprising the sub-steps of:
        i) precipitating alkanes in a first solvent by combining the crude extract of step b) with the first solvent to form a mixture, cooling the mixture, and removing the precipitated alkanes from the mixture by filtration;
        ii) removing at least a portion of the first solvent from the mixture of sub-step i) by partial distillation to form a sub-step ii) mixture;
        iii) solvent exchanging the sub-step ii) mixture into heptane to form a sub-step iii) mixture;
        iv) removing the remaining first solvent from the sub-step iii) mixture by aqueous phase separation, resulting in a heptane solution;
        v) heating the heptane solution of sub-step iv) and filtering it to form a filtered sub-step v) mixture;
        vi) cooling the filtered sub-step v) mixture while agitating to form a sub-step vi) mixture;
        vii) seeding the sub-step vi) mixture and propagating the seed, resulting in a sub-step vii) suspension;
        viii) cooling, stirring, filtering and washing the sub-step vii) suspension, resulting in a sub-step viii) product; and
        ix) de-liquoring and drying the sub-step viii) product to produce a stable substantially pure cannabinoid.

2. The process as claimed in claim 1 wherein the cannabinoid comprises: cannabichromene (CBC), cannabichromenic acid (CBCV), cannabidiol (CBD), cannabidiolic acid (CBDA), cannabidivarin (CBDV), Cannabidiol-C1 (CBD-C1) also known as cannabidiorcol, Cannabidiol-C4 (CBD-C4) also known as nor-cannabidiol, cannabidiol-C6 (CBD-C6), cannabigerol (CBG), cannabigerol propyl variant (CBGV), cannabicyclol (CBL), cannabinol (CBN), cannabinol propyl variant (CBNV), cannabitriol (CBO), tetrahydrocannabinol (THC), tetrahydrocannabinolic acid (THCA), tetrahydrocannabivarin (THCV) or tetrahydrocannabivarinic acid (THCVA).

3. The process as claimed in claim 1 wherein the cannabinoid is cannabidiol (CBD).

4. The process as claimed in claim 1 wherein the extraction step is carried out using liquid CO2 at a temperature of 25° C. and pressure of 100 Barg.

5. The process as claimed in claim 1 wherein the first solvent comprises methanol.

6. The process as claimed in claim 1 wherein the winterizing in sub-step i) is carried out at a temperature between 0° C. to 5° C.

7. The process as claimed in claim 1 wherein the aqueous phase separation in sub-step iv) comprises two or three aqueous washes.

8. The process as claimed in claim 1 wherein the winterizing in sub-step i) uses a filter aid that does not contain vanadium.

9. The process as claimed in claim 1 wherein the winterizing in sub-step i) comprises adding a filter aid to remove the precipitated alkanes from the mixture.

10. The process as claimed in claim 1 wherein the winterizing in sub-step i) does not use a filter aid.

11. The process as claimed in claim 10 wherein a chelating agent is added during the solvent exchange.

12. The process as claimed in claim 11 wherein the chelating agent is citric acid.

13. The process as claimed in claim 1 comprising adding one or more antioxidants to the stable substantially pure cannabinoid.

14. The process as claimed in claim 13 wherein the one or more antioxidants comprises citric acid or ascorbyl palmitate.

15. The process as claimed in claim 1 wherein the substantially pure cannabinoid is CBD and has a purity of >95%.

16. The process as claimed in claim 1 wherein THC is present in the stable substantially pure cannabinoid at less than 0.15%.

17. The process as claimed in claim 1 wherein CBDV is present in the stable substantially pure cannabinoid at up to 1%.

18. The process as claimed in claim 1, wherein the first solvent is methanol.

19. The process as claimed in claim 1, wherein the extracting step b) comprises methanol extraction, and the aqueous phase separation of sub-step iv) reduces methanol to a level of <0.5% w/w in the heptane solution.

* * * * *